(12) United States Patent
Love et al.

(10) Patent No.: US 11,874,127 B1
(45) Date of Patent: Jan. 16, 2024

(54) LANGUAGE MODELS AND MACHINE LEARNING FRAMEWORKS FOR OPTIMIZING VEHICLE NAVIGATION ROUTES AND VEHICLE OPERATOR SESSIONS

(71) Applicant: SurgeTech, LLC, Austin, TX (US)

(72) Inventors: Michael Love, Marble Falls, TX (US); Blake Love, Austin, TX (US); Tiago Soromenho, Austin, TX (US)

(73) Assignee: SURGETECH, LLC, Austin, TX (US)

( * ) Notice: Subject to any disclaimer, the term of this patent is extended or adjusted under 35 U.S.C. 154(b) by 0 days.

(21) Appl. No.: 18/121,416

(22) Filed: Mar. 14, 2023

(51) Int. Cl.
| | |
|---|---|
| *G01C 21/36* | (2006.01) |
| *G06Q 50/30* | (2012.01) |
| *G10L 15/183* | (2013.01) |
| *G01C 21/34* | (2006.01) |
| *G06Q 30/0201* | (2023.01) |

(52) U.S. Cl.
CPC ..... *G01C 21/3608* (2013.01); *G01C 21/3438* (2013.01); *G01C 21/3484* (2013.01); *G01C 21/3617* (2013.01); *G06Q 30/0206* (2013.01); *G06Q 50/30* (2013.01); *G10L 15/183* (2013.01)

(58) Field of Classification Search
CPC ........... G01C 21/3484; G01C 21/3608; G01C 21/3438; G01C 21/3453; G01C 21/3461; G01C 21/3469; G01C 21/3617; G01C 21/362; G06Q 30/0206; G06Q 50/30; G10L 15/01–34
See application file for complete search history.

(56) References Cited

U.S. PATENT DOCUMENTS

| | | | |
|---|---|---|---|
| 2019/0251496 A1* | 8/2019 | DaCosta | H04W 4/20 |
| 2022/0013108 A1* | 1/2022 | Knight | G06F 40/35 |
| 2023/0236033 A1* | 7/2023 | Simoudis | G06Q 10/04 |
| | | | 701/425 |

* cited by examiner

*Primary Examiner* — Spencer D Patton
(74) *Attorney, Agent, or Firm* — Bryan Cave Leighton Paisner LLP

(57) ABSTRACT

This disclosure relates to improved techniques for personalizing vehicle routes and operator sessions using pre-trained machine learning language models. In certain embodiments, a language model is trained on operator interaction data to learn operator route preferences for vehicle operators. These learned operator route preferences can be leveraged to optimize and personalize vehicle routes and operator sessions in various ways. Other embodiments are disclosed herein as well.

26 Claims, 12 Drawing Sheets
(1 of 12 Drawing Sheet(s) Filed in Color)

180 – Operator Route Preferences

181 – Ride Duration Preferences

182 – Distance Preferences

183 – Operating Area Preferences

184 – Fuel Preferences

185 – Intermediate Stop Preferences

186 – Dining Preferences

187 – Revenue Preferences

188 – Passenger Preferences

189 – Road Preferences

610 — Providing a navigation application comprising a client interface that facilitates interactions between a language model and a vehicle operator and a route generation engine that is configured to compute vehicle routes

620 — Collecting operator interaction data corresponding to interactions between the vehicle operator and the language model

630 — Determining one or more operator route preferences based, at least in part, on the operator interaction data using the language model

640 — Generating a personalized vehicle route based, at least in part, on the operator route preferences determined by the language model

650 — Outputting the personalized vehicle route for the vehicle operator via the navigation application

LANGUAGE MODELS AND MACHINE LEARNING FRAMEWORKS FOR OPTIMIZING VEHICLE NAVIGATION ROUTES AND VEHICLE OPERATOR SESSIONS

TECHNICAL FIELD

This disclosure is related to improved systems, methods, and techniques for utilizing pre-trained language models to optimize or personalize vehicle routes and/or vehicle sessions for vehicle operators. In certain embodiments, one or more generative pre-trained transformer models can be executed to interact with vehicle operators and personalize vehicle routes and/or vehicle sessions for the vehicle operators.

BACKGROUND

Various types of devices and applications can be utilized to compute routes for vehicle operators. In one example, individuals can access mobile or web-based mapping and navigation applications (e.g., such as those provided by Google Maps®, Apple Maps®, Waze®, and other providers) to obtain directions to destination locations along with real-time, turn-by-turn directions to destination locations. In another example, ride hailing applications installed of devices of vehicle operators can provide similar navigation functions in connection with transporting passengers from pickup locations to desired destination locations. In a further example, vehicle navigation devices (e.g., such as portable navigation devices provided by Garmin® and/or pre-installed vehicular navigation systems) can execute similar navigation functions and output real-time directions on dedicated displays.

While these are other navigation systems provide useful tools, the manner in which they calculate or identify vehicle routes has several shortcomings. In many cases, the routes selected by these navigation applications are based solely on a single factor— i.e., to minimize the time from an origin location to a destination location. Notably, these navigation applications do not account for vehicle operator's preferences or activity patterns in calculating or selecting a route from the origin destination to the destination location. For example, in scenarios where a vehicle operator is taking a long trip, the routes selected by these navigation applications do not account desired stops (e.g., for dining, restroom breaks, etc.), nor do they customize routes based on available scenic views or other preferences that may be desired by the vehicle operators.

Additional shortcomings of traditional navigation applications can be attributed to the fact the determined vehicle routes are not optimized for a vehicle operator session that can include multiple segments, multiple stops, and/or multiple pick-ups. Rather, these traditional navigation applications are focused solely focus on minimizing a time duration between an origin and destination location, and fail to holistically consider optimal routes for vehicle operators throughout the entirety of the sessions. These narrowly focused route selection techniques employed by traditional navigation applications can degrade the experiences of the vehicle operators and often require vehicle operators to manually customize the vehicle routes.

BRIEF DESCRIPTION OF DRAWINGS

The patent or application file contains at least one drawing executed in color. Copies of this patent or patent application publication with color drawing(s) will be provided by the Office, upon request and payment of the necessary fee.

To facilitate further description of the embodiments, the following drawings are provided, in which like references are intended to refer to like or corresponding parts, and in which:

FIG. 4 is a block diagram demonstrating exemplary operator route preferences that can be learned by a language model in accordance with certain embodiments;

FIG. 6 is a flowchart illustrating an exemplary method in accordance with certain embodiments.

Figure 1A:
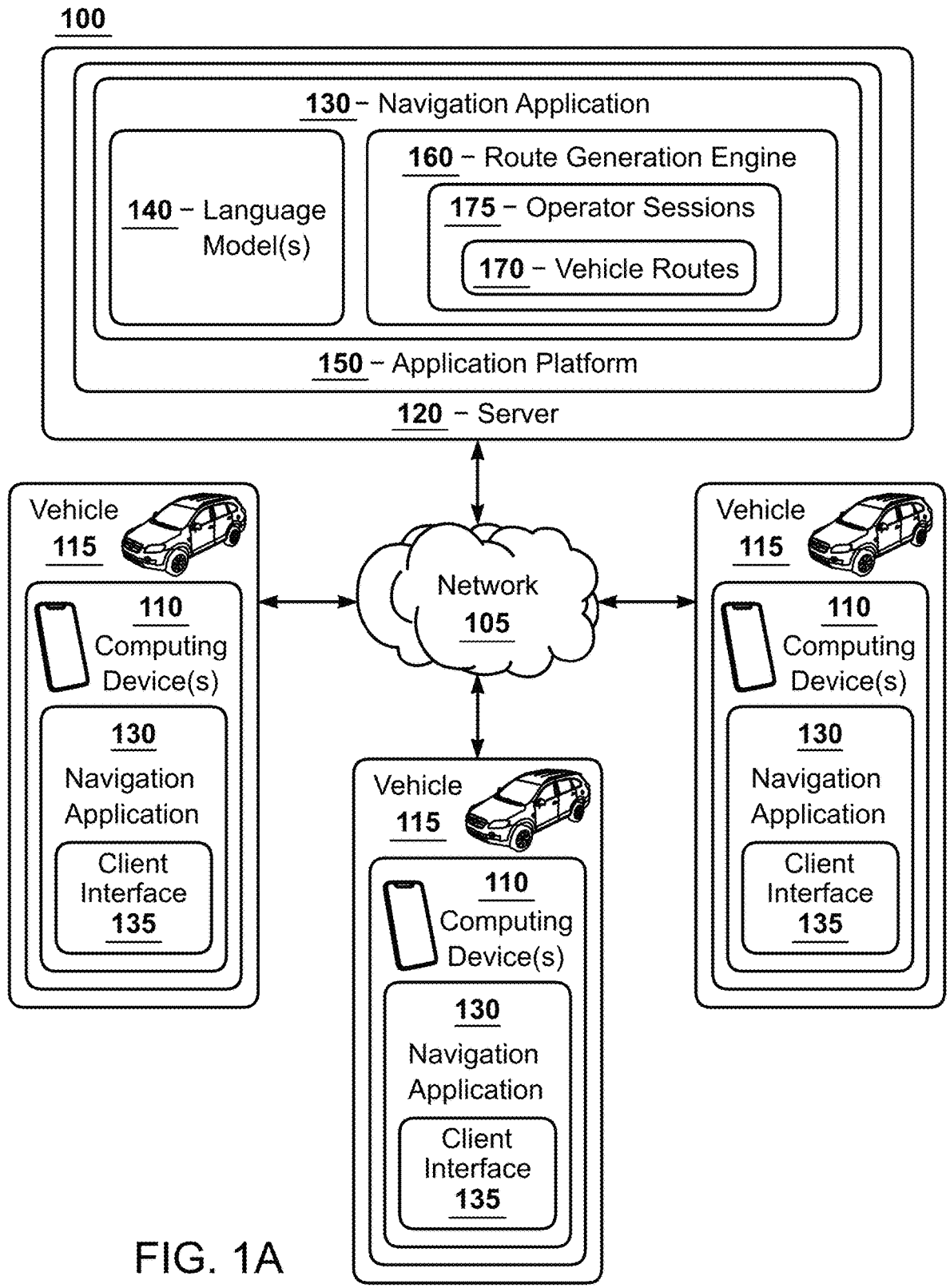
FIG. 1A is a diagram of an exemplary system in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

For ease of reference, the term "vehicle operator" is utilized throughout this disclosure to refer to an end-user or individual that interacts with the navigation application described herein. However, it should be understood that the term is intended to be utilized very broadly, and generally can correspond to any end-user or any individual, including those who do not operate vehicles. For example, in some embodiments, the vehicle operator may simply refer to an end-user who accesses the navigation application to obtain routing information with no intention to operate a vehicle.

DETAILED DESCRIPTION OF EXEMPLARY EMBODIMENTS

The present disclosure relates to systems, methods, apparatuses, computer program products, and techniques for using artificial intelligence (AI) or machine learning language models to interact with vehicle operators and personalize vehicle routes presented to the vehicle operators. In certain embodiments, a navigation application is provided that can be executed to generate personalized vehicle routes. The navigation application provides a client interface that facilitates communications between vehicle operators and a language model. Amongst other things, the vehicle operators can interact with the language model in connection with planning vehicle routes for trips or rides. Based on interactions with the vehicle operators, the language model can learn individualized operator route preferences for each vehicle operator. The language model also can communicate with a route generation engine to create or identify personalized vehicle routes for the vehicle operators based on the learned operator route preferences.

In certain embodiments, the language model can serve as an intermediary that is situated between the client interface (or vehicle operator) provided via a front-end of the navigation and the route generation engine executed by the back-end of the user application. The language model can translate and discern the meaning or intention of inputs received via the client interface from the vehicle operators, and can glean operator route preferences from current or historical interactions with the vehicle operators. When the vehicle operators desire routing information to destination locations, the language model can communicate with the route generation engine to generate personalized vehicle routes for the vehicle operators based on the operator route preferences learned by the language model. These customized or personalized vehicle routes can be output via the client interface of the navigation application and, in many cases, can be displayed in real-time to vehicle operators with turn-by-turn routing information during operation of vehicles.

In addition to personalizing individual vehicle routes, the technologies described herein can be utilized to customize operator sessions, each of which may comprise multiple vehicle routes in some instances. In general, an operator session may span a period of time during which a vehicle operator continuously or intermittently operates a vehicle. For example, a vehicle operator may operate a vehicle over a time period spanning multiple hours and, during that operator session, the operator may stop at various locations and operate the vehicle along multiple intermediate vehicle routes. As discussed in further detail below, the operator route preferences learned by the language model can be utilized to optimize or personalize both the individual vehicle routes and the overall operator session.

In some particularly useful embodiments, the techniques described herein can be utilized by ride hailing applications to optimize and personalize vehicle routes and/or operator sessions that involve transporting passengers. In these scenarios, a vehicle operator may initiate an operator session that spans multiple hours and, during that operator session, the operator may pick up multiple passengers and operate the vehicle along multiple vehicle routes to transport the passengers to various destinations. In addition to optimizing the individual vehicle routes for transporting each of the passengers to a given destination, the techniques described herein can be utilized to optimize the overall operator session based on the ride hailing operator's preferences (e.g., based on the operator's preferences for where or when to dine, preferences for generating revenue during the operator session, avoiding certain geographic areas, etc.).

The language model be trained to learn or extract various types of operator route preferences for each of the vehicle operators. Examples of operator route preferences can include ride duration preferences, distance preferences, operating area preferences, fuel preferences, intermediate stop preferences, dining preferences, revenue preferences, and passenger preferences. These and other types of operator route preferences are described in further detail below. Any or all of the operator route preferences described throughout this disclosure can be utilized to customize or personalize vehicle routes and/or vehicle sessions for vehicle operators.

The language model can discern or learn these the operator route preferences based on operator interaction data generated or collected for vehicle operators. In general, the operator interaction data for a vehicle operator can include various types of data or information useful for understanding the vehicle operator's preferences with respect to operating a vehicle, or useful for planning a vehicle route or operator session. The operator interaction data can be collected from various sources. In some instances, the operator interaction data can include data collected from historical interactions between the vehicle operator and the language model and/or interactions between the vehicle operator and the language model in connection with planning a current vehicle route or operator session. Additionally, some or all of the operator interaction data for a vehicle operator can be obtained from the vehicle operator's interactions with one or more third-party applications or third-party service provider platforms (e.g., third parties that provide ride hailing applications, navigation applications, traffic applications, location-tracking applications, and other applications). The operator interaction data can be continuously fed into the language model over time, thereby enabling the language model to continuously update and/or refine the operator route preferences for each of the vehicle operators.

The configuration of the language model can vary. In some embodiments, the language model can include one or more generative pre-trained transformer (GPT) models 141 (e.g., a GPT-1, GPT-2, GPT-3, or subsequently developed GPT model). Additionally, or alternatively, the language model 140 can include one or more BERT (Bidirectional Encoder Representations from Transformers) models, one or more XLNet models, one or more RoBERTa (Robustly Optimized BERT pre-training approach) model, and/or one or more T5 (Text-to-Text Transfer Transformer) models. Additionally, in some scenarios, the language model can represent a single model and, in other scenarios, the language model can be comprised of multiple language models that cooperate together.

As explained in further detail below, various training procedures can be applied to the language model. In certain embodiments, a self-supervised training procedure can initially be applied to train the language model on a training dataset that is derived from a text corpus accumulated from multiple sources, such as web pages, books, academic articles, news articles, and/or other text-based works. Additionally, a transfer learning procedure subsequently can be applied to train the language model using a domain-specific dataset that comprises textual content relating to planning vehicle routes and/or textual content relating interactions between vehicle operators and the language model. Training the language model with this domain-specific textual content improves the accuracy of the language model with respect to personalizing vehicle routes and/or operator sessions, and permits the language model to communicate more effectively with both vehicle operators and the route generation engine.

The technologies and techniques utilized by the navigation application can be incorporated into various types of applications and systems. In one example, the technologies can be incorporated into ride hailing applications that provide routing information to drivers in connection with transporting passengers. These technologies similarly can be incorporated into courier applications, logistic planning applications, transportation applications, food ordering or delivery applications, taxi scheduling applications, and/or other applications that utilize routing information. In other examples, the technologies can be incorporated into mapping and/or navigation applications that provide routing directions to various types vehicle operators. In other examples, the technologies can be incorporated into applications or functions that are executed by vehicular computing devices (e.g., computing devices directly integrated in vehicle dashboards and/or portable devices that can be installed or utilized within a vehicle cabin) to provide routing information to vehicle operators. The technologies can be incorporated into many other types of applications and systems as well.

The systems and methods described herein provide a technological framework that provides a variety of benefits and advantages. Amongst other things, AI and machine learning technologies can be utilized to interact with the vehicle operators, and improve user experiences with planning vehicle routes and/or operator sessions. Additionally, the ability of the language model to communicate with the route generation engine allows for a granular customization of vehicle routes based on operator route preferences learned by the language model. In some embodiments, improved training procedures can be applied to enhance the functionality of the language model with regard to communicating with the vehicle operators and/or the route generation engine, as well as for optimizing vehicle routes and/or operator sessions based on preferences of the vehicle operators. The enhanced functionality of the language models can be attributed, at least in part, to the usage of domain-specific datasets to supplement the training of the language model. Additionally, in some embodiments, the improved functionality of the language model also can be attributed, at least in part, to a continuous learning framework that enables the language model to continuously learn and refine operator route preferences over time based on operator interaction data collected for the vehicle operators. Amongst other things, this continuous learning framework also can enable the language model to discern various individualized preferences for each of the vehicle operators, which, in turn, can be utilized to generate the personalized vehicle routes and/or operator sessions described herein.

The technologies described herein provide many additional benefits and advantages. One advantage is that vehicle operators can communicate with a language model to plan and/or modify vehicle routes without having to manually enter detailed route parameters. Another advantage is that the vehicle routes and/or operator sessions can automatically be personalized or customized to each of the vehicle operators based on current and/or historical operator interactions or activity patterns. For example, in some cases, the vehicle routes and/or operator sessions can be personalized or customized based on road preferences, revenue preferences, location preferences, dining preferences, etc. Many other advantages will be apparent based on a review of this disclosure.

Additional benefits can be attributed to embodiments in which the navigation application, or technologies described herein, are integrated into ride hailing applications. In these embodiments, the personalized routes can be generated during a current operator session, which can involve multiple stops and/or multiple pickups of passengers. In these scenarios, an optimal route can be selected holistically for the entirety of the operator session based on a consideration of the vehicle operator preferences.

Additional benefits can be attributed to embodiments in which ride hailing applications (or other types of navigation applications) utilize surge pricing functions to price rides for passengers or customers. Such applications that employ surge pricing functionalities can better mitigate imbalances between an available supply of vehicle operators and a demand for those vehicle operators. The surge pricing functionalities can dynamically adjust prices for the rides, thereby enabling providers of the applications to reduce high-demand peaks. Additionally, the route personalization functionalities executed by the applications can account for surge pricing factors in connection with optimizing or personalizing vehicle routes. For example, based on operator route preferences, the language model can generate personalized vehicle routes that intentionally direct vehicle operators to areas where there is high demand (e.g., to maximize revenue for the vehicle operators) and/or can intentionally avoid areas of high demands (e.g., to avoid inconveniencing vehicle operators with high-traffic conditions, density populated areas, etc.).

Additionally, while certain portions of this disclosure describe applications of these technologies to automobiles, it should be understood that these technologies can be used to optimize or personalize vehicle routes and/or operator sessions for any type of vehicle including, but not limited to ground-based vehicles (e.g., buses, trucks, motorcycles, bicycles, etc.), air-based vehicles (e.g., aircraft, planes, helicopters, airships, unmanned drones, etc.), and/or water-based vehicles (e.g., ships, boats, submarines, etc.).

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
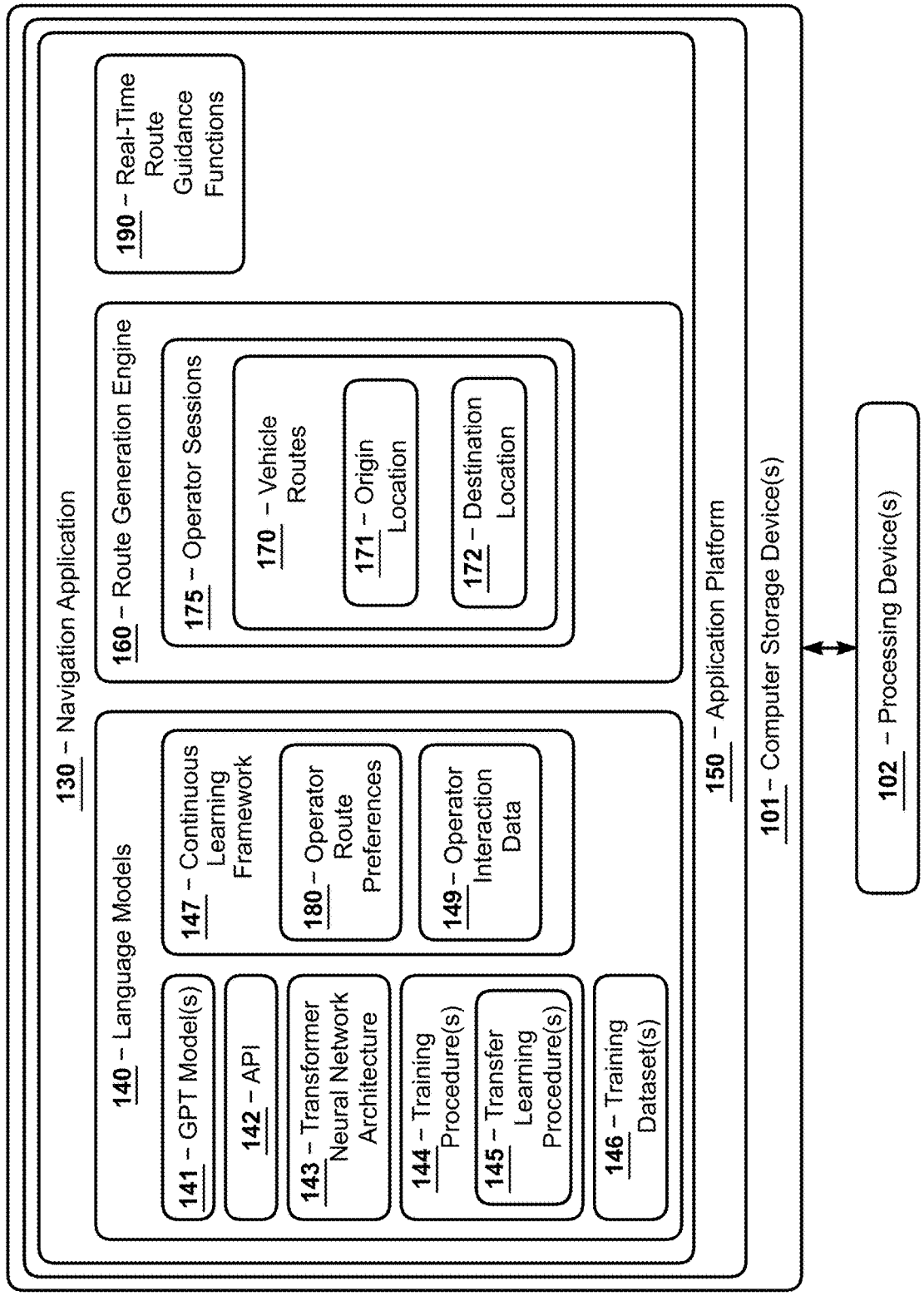
FIG. 1B is a block diagram demonstrating exemplary features of an application platform in accordance with certain embodiments.

FIG. 1A is a diagram of an exemplary system 100 in accordance with certain embodiments. FIG. 1B is a diagram illustrating exemplary features and/or functions associated with an application platform 150.

The system 100 comprises one or more computing devices 110 and one or more servers 120 that are in communication over a network 105. An application platform 150 is stored on, and executed by, the one or more servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1A, including the computing devices 110, servers 120, and application platform 150 can be configured to communicate directly with each other and/or over the network 105 via wired or wireless communication links, or a combination of the two. Each of the computing devices 110, servers 120, and application platform 150 can include one or more communication devices, one or more computer storage devices 101, and one or more processing devices 102 that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices including, but not limited to, instructions associated with executing the functions associated with the user application 130, language model 140, application platform 150 and/or route generation engine 160.

The one or more computer storage devices may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the storage devices 101 may be physical, non-transitory mediums. The one or more computer storage devices can store instructions associated with executing the functions associated with the user application 130, language model 140, application platform 150 and/or route generation engine 160.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable the computing devices 110, server(s) 120, and/or application platform 150 to be connected to the Internet and/or other network. The modem devices can permit bi-directional communication between the Internet (and/or other network) and the computing devices 110, server(s) 120, and/or application platform 150. In certain embodiments, one or more router devices and/or access points may enable the computing devices 110, server(s) 120, and/or application platform 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, server(s) 120, and/or application platform 150 to access the Internet and/or other networks.

In certain embodiments, the computing devices 110 may represent mobile devices (e.g., smart phones, personal digital assistants, tablet devices, vehicular computing devices, wearable devices, or any other device that is mobile in nature), desktop computers, laptop computers, and/or other types of devices. The one or more servers 120 may generally represent any type of computing device, including any of the computing devices 110 mentioned above. The one or more servers 120 also can comprise one or more mainframe computing devices and/or one or more virtual servers that are executed in a cloud-computing environment. In some embodiments, the one or more servers 120 can be configured to execute web servers and can communicate with the computing devices 110 and/or other devices over the network 105 (e.g., over the Internet).

In certain embodiments, the application platform 150 can be stored on, and executed by, the one or more servers 120 and the one or more computing devices 110 can enable individuals to access the application platform 150 over the network 105 (e.g., over the Internet via an application 130 and/or web browser application). Additionally, or alternatively, the application platform 150 can be stored on, and executed by, the one or more computing devices 110. For example, the application platform 150 (or its related functionalities) also can be stored as a local application on a computing device 110, or integrated with a local application stored on a computing device 110, to implement the techniques and functions described herein. The application platform 150 can be executed be stored on, and executed by, other devices as well.

In certain embodiments, the application platform 150 hosts a navigation application 130 that is configured to optimize or personalize vehicle routes 170 and/or operator sessions 175 for vehicle operators. The navigation application 130 can include, inter alia, a client interface 135, a language model 140, and a route generation engine 160. In some cases, the navigation application 130 can include a front-end that is installed on, and executed by, the computing devices 110 (e.g., smart phone or mobile devices) operated by vehicle operators and a back-end that is installed on, and executed by, the servers 120. The client interface 135 can be presented via the front-end of the navigation application 130, and the language model 140 and/or route generation engine 160 can be stored or accessed by the back-end of the navigation application 130. In some embodiments, the functionalities of both the front-end and back-end of the navigation application 130 discussed throughout this disclosure can be installed on, and executed by, a single device (e.g., a computing device 110 or server 120).

The client interface 135 can be displayed on computing devices 110 operated by vehicle operators. The client interface 135 enables vehicle operators operating the computing devices 110 to interact with the application platform 150, such as to plan, create, personalize, and/or modify vehicle routes 170 and/or operator sessions 175 for various types of vehicles 115. Certain portions of this disclosure describe embodiments in which the vehicles 115 correspond to automobiles. However, the techniques described herein can be used to optimize or personalize vehicle routes 170 and/or operator sessions 175 for any type of vehicle 115 including, but not limited to ground-based vehicles (e.g., buses, trucks, motorcycles, bicycles, etc.), air-based vehicles (e.g., aircraft, planes, helicopters, airships, unmanned drones, etc.), and/or water-based vehicles (e.g., ships, boats, submarines, etc.).

The client interface 135 can include one or more graphical user interfaces (GUIs) that are configured to receive inputs from, and output data and information to, vehicle operators. The client interface 135 also can include interactive options (e.g., buttons, menus, text prompts, etc.) that enable vehicle operators to enter and provide inputs. The client interface 135 can further provide a function or mechanism that enables a vehicle operator to communicate with a language model 140 in connection with planning, creating, personalizing, and/or modifying vehicle routes 170 and/or operator sessions 175.

In general, a vehicle route 170 can correspond to a pathway, or series of pathways, that a vehicle 115 takes between an origin location 171 and a destination location 172. In scenarios where a vehicle 115 corresponds to an automobile or other ground-based vehicle, the vehicle route 170 can correspond to a road pathway that can be taken between the origin location 171 and the destination location 172. In some cases, the origin location 171 may be a current geographic location of a vehicle operator (or vehicle 115 operating by the operator), which can be ascertained by obtaining location information (e.g., global positioning system or GPS coordinates) from a computing device 110 utilized by the vehicle operator. Additionally, or alternatively, the origin location 171 may be identified by inputs (e.g., text-based or voice-based inputs) that a vehicular operator provides via the client interface 135. The destination location 172 also can be specified by the vehicle operator via the client interface 135. Additionally, or alternatively, the destination location 172 can be a location that is identified by the navigation application 130 (e.g., a destination location specified by a ride hailing passenger for a ride).

As explained throughout this disclosure, the language model 140 is configured to optimize or personalize vehicle routes 170 based, at least in part, on operator route preferences 180 learned by the language model 140 for each individual vehicle operator. In one example, when a user accesses the navigation application 130, the vehicle operator can provide an input via the client interface 135 to request a vehicle route 170 from an origin location 171 (e.g., which, in some cases, may be a current location of the operator) to a destination location 172. In response to receiving the input from the vehicle operator, the language model 140 can initiate a communication exchange with a route generation engine 160 to identify an optimal vehicle route 170. In many scenarios, the language model 140 is configured to learn and store operator route preferences 180, which can be utilized by the language model 140 to optimize or personalize the vehicle route for the vehicle operator. For example, the learned operator route preferences 180 can be utilized to generate a custom vehicle route 170 based on preferences for dining options, scenic views, route duration or distance, fuel or mileage requirements, and/or many other preferences.

The language model 140 also can be configured to optimize or personalize operator sessions 175 based, at least in part, on the operator route preferences 180 learned by the language model 140 for each individual vehicle operator. In general, an operator session 175 can correspond to session or period of time when a vehicle operator continuously or intermittently is operating a vehicle or plans to operate a vehicle. Each vehicle session 175 can comprise of one or more vehicle routes 170 and, in many cases, can comprise multiple vehicle routes 170.

In one example, an operator session 175 can correspond to a session or time period during which a ride hailing vehicle operator is operating a vehicle 115 to provide transport services for passengers. During the operator session 175, the vehicle operator can pick up passengers at various origin locations 171 and transport those passengers to various destination locations 172. The vehicle 115 may be operated continuously during the operator session 175 in some scenarios, or may be operated intermittently (e.g., in scenarios where the operator stops for dining, restrooms, or breaks).

Like the individual vehicle routes 170, an operator session 175 for a vehicle operator can be customized in various ways using the operator route preferences 180 learned by the language model 140. For example, when a vehicle operator initiates an operator session 175, the vehicle operator may provide an input indicating that he or she wishes to provide ride hailing services for the next six hours, maximize revenue during the session, make an intermediate stop at a restaurant for lunch, and end the session in a location near the operator's residence. In this example, the language model 140 may communicate with the route generation engine 160 over the course of the operator session 175 to identify vehicle routes 170 satisfying the specified operator route preferences 148 for the operator session 175. The language model 140 also may utilize previously learned operator route preferences 148 to customize the vehicle routes 170 and/or other parameters of the operator session 175 (e.g., such as operator route preferences 148 for only picking up passengers that having high ratings, dining at a preferred restaurant at a preferred lunch or break time, etc.). Consistent with the operator route preferences 148, the language model 140 also may conclude the operator session 175 by identifying a final passenger pickup or final vehicle route 170 that places the vehicle operator near the operator's residence at the ending of the operator session 175 (e.g., six hours after the start of the operator session 175 based on the operator route preferences 148).

Further details and examples of how the language model 140 can personalize vehicle routes 170 and/or operator sessions 175 for vehicle operators are described throughout this disclosure.

The language model 140 can learn the operator route preferences 180 for each vehicle operator using a variety of techniques. In certain embodiments, the language model 140 can be trained on operator interaction data 149 to learn operator route preferences 180 for each vehicle operator. The operator interaction data 149 for a vehicle operator can generally include any data or information that can be useful for understanding the vehicle operator's preferences with respect to operating a vehicle 115 and/or planning a vehicle route 170 or operator session 175. The operator interaction data 149 can be collected from various sources.

In some cases, the operator interaction data 149 can include data collected from historical interactions between the vehicle operator and the language model 140 (e.g., in connection with previous trips or rides). The operator interaction data 149 also can include data collected from interactions between the vehicle operator and the language model 140 in connection with planning a current trip or ride. For example, when the vehicular operator engages the language model 140 to schedule an upcoming vehicle route 170 or operator session 175, the inputs provided by the vehicle operator can specify certain preferences that can be understood by the language model 140 and utilized to optimize the vehicle route 170 or operator session 175.

Additionally, or alternatively, the operator interaction data 149 for the vehicle operator can be obtained from one or more external applications or external service provider platforms. For example, in some cases, a variety of third-party applications may be installed on a computing device 110 of the vehicle operator, along with the navigation application 130. These third-party applications can include ride hailing applications, third-party mapping and navigation applications, traffic applications, location tracking applications, and other applications (e.g., including those such as by Uber® Driver App, Lyft® Driver App, Google Maps®, Apple Maps®, etc.). In some embodiments, some or all of the operator interaction data 149 can be obtained directly from these third-party applications and/or by communicating with service provider servers that provide the related services and functionalities.

Regardless of the source from which the operator interaction data 149 is collected, feeding the operator interaction data 149 into the language model 140 can enable the language model 140 to discern or learn various operator route preferences 180 for each of the vehicle operators. Additionally, the operator interaction data 149 can be continuously fed to the language model 140 over time to enable the language model 140 to update and/or refine the operator preferences with greater precision and granularity. In turn, this language model 140 can utilize these operator route preferences 180 to personalize or optimize the vehicle routes 170 and/or operator sessions 175 for each of the vehicle operators.

FIG. 4 is a block diagram illustrating exemplary types of operator route preferences 180 that can be learned by the language model 140. The exemplary operator route preferences 180 discussed below can be ascertained for each vehicle operator based on an analysis of operation interaction data 149 correlated with the vehicle operator, and any of these operator route preferences 180 can be utilized to optimize or personalize vehicle routes 170 and/or vehicle sessions 175 for each of vehicle operator.

Ride Duration Preferences 181: The ride duration preferences 181 can generally identify a preferred duration or temporal-related preference for a vehicle route 170 and/or operator session 175. In some cases, the ride duration preferences 181 can specify a specific time (e.g., ten minutes or five hours) for a vehicle route 170 and/or operator session 175. The ride duration preferences 181 also indicate duration preferences 181 more generally. For example, the ride duration preferences 181 may indicating that a vehicle operator typically prefers the shortest or quickest duration to destinations, or that the vehicle operator is not particularly concerned with minimizing ride duration (e.g., in scenarios where the vehicle operator may prefer side roads over highways or may prefer scenic routes).

In scenarios where the navigation application 130 provides ride hailing services, the ride duration preferences 181 also may specify a time period or interval for a ride hailing operator session during which the vehicle operator intends to provide transport services to passengers. In some scenarios, the ride duration preferences 181 also may specify preferences for an operator session 175 indicating whether the vehicle operator prefers fewer (but lengthier vehicle routes 170) for transporting passengers or prefers a plurality of shorter trips for transporting passengers.

Distance Preferences 182: The distance preferences 182 can generally identify a preferred distance or operating range for a vehicle route 170 and/or operator session 175. In some cases, the distance preferences 182 may indicate that the vehicle operator generally prefers a vehicle route 170 that represents the shortest distance to a destination location 172 (e.g., in scenarios where vehicle operators desire to minimized fuel consumption or mileage) or may indicate that the vehicle operator is not particularly concerned with the distance if a quicker route is available. In terms of an operator session 175, the distance preferences 182 may indicate that the vehicle operator prefers to operate a vehicle 115 during the session with a range (e.g., within 10 miles or 50 miles) of a particular reference location (e.g., the operator's residence or current location).

Operating Area Preferences 183: The operating area preferences 183 can generally identify geographic regions (e.g., neighborhoods, towns, cities, etc.) that that are favored or disfavored by the vehicle operator. Disfavored regions may be excluded from (or given a lower priority for inclusion in) vehicle routes 170 and/or vehicle sessions 175 identified by the language model 140, while favored regions may be included (or given a higher priority for inclusion in) vehicle routes 170 and/or vehicle sessions 175 identified by the language model 140. In scenarios where the navigation application 130 provides ride hailing services, the operating area preferences 183 may identify regions where the vehicle operator prefers or disfavors providing ride hailing services.

Fuel Preferences 184: The fuel preferences 184 can generally indicate a vehicle operator's preferences for consuming fuel during vehicle route 170 and/or operator sessions 175. In some cases, the fuel preferences 184 can generally indicate whether or not the vehicle operator is conscious or conservative in terms of fuel consumption (or related costs for fuel). In some cases, the fuel preferences 184 can indicate a preferred fuel usage for a vehicle route 170 and/or operator session 175 (e.g., in connection with providing ride hailing services).

Intermediate Stop Preferences: 185: The intermediate stop preferences 185 can generally whether a vehicle operator desires to make a stop either during a current vehicle route 170 or operator session 175, or more generally when operating the vehicle 115. In some examples, the intermediate stop preference 185 may identify a pit stop (e.g., such as dining option, coffee shop, book store, grocery store, home, and/or other location) where the vehicle operator wishes (or likely desires) to visit during the course of the vehicle route 170 or operator session 175. In some cases, an intermediate stop preference 185 can be explicated requested by the vehicle operator when in connection with scheduling a new or upcoming vehicle route 170 or operator session 175. Additionally, or alternatively, the intermediate stop preference 185 can be learned by the language model 140 based on previous activity patterns of the vehicle operator.

Dining Preferences 186: The dining preferences 186 can generally identify locations where a vehicle operator prefers dining or eating (e.g., restaurants, cafes, fast food locations, etc.) during a vehicle route 170 or operator session 175 and/or types of food preferred by the vehicle operator. In some cases, the dining preferences 186 can be utilized to customize selections for the aforementioned intermediate stop preferences 185.

Revenue Preferences 187: The revenue preferences 187 can identify various types of preferences for generating revenue in connection with a vehicle route 170 or operator session 175. For example, in scenarios where the navigation application 130 provides functions business related transport functions (e.g., ride hailing services, courier services, food delivery services, etc.), the vehicle operator can specify preferences for generating revenue (e.g., indicating whether the vehicle operator wishes to accept passenger or delivery requests to maximize revenue or possibly make less revenue by taking less strenuous routes). In some cases, the revenue preferences 187 can indicate whether or not the vehicle operator prefers to accept passenger rides that are subject to surge pricing due to increased demand (in some cases, which may require travel to density populated regions and/or high traffic regions). It should be recognized that the revenue preferences 187 are not limited to considerations of revenue for providing ride hailing services, and can be applied to many other types of transportation services (e.g., courier services, food delivery services, etc.).

Passenger Preferences 188: The passenger preferences 188 can generally identify preferences for transporting passengers (e.g., in connection with providing ride hailing services, taxi services, or the like). In some cases, each passenger may be assigned a rating based on feedback provided by vehicle operators who have transported the passenger. Thus, in some scenarios, the passenger preferences 188 can identify a vehicle operator's preferred rating for passengers (e.g., to only accept rides for passengers above a threshold rating and/or to accept any passenger regardless of rating).

Road Preferences 189: The road preferences 189 can generally identify a vehicle operator's preference (or aversion) for taking particular roads and/or certain types of roads. For example, the road preferences 189 can identify specific roads that are preferred or disliked by a vehicular operator based on traffic conditions, scenic views offered, and/or other factors. The road preferences also can identify a vehicle operator's preference to take particular types of road (e.g., local road vs. highways).

The language model 140 can learn any of the above-described operator route preferences 180 based, at least in part, on analysis of operator interaction data 149 accessed by the language model 140. As explained throughout this disclosure, this operator interaction data 149 can be generated based on interactions between the vehicle operators and the language model 140 (both in connection with a current trip and/or historical routes or sessions) and/or can be obtained from third-party systems and applications.

The above-described operator route preferences 180 are intended to provide examples of vehicle operator preferences that can be learned by the language model 140. However, it should be understood that the language model 140 can learn many other types of operator route preferences 180.

Returning to FIGS. 1A and 1B, the language model 140 can communicate with the route generation engine 160 to compute or identify an optimal vehicle route based on the operator route preferences 180 for a given vehicle operator. The route generation engine 160 can include and/or access a comprehensive database that precisely identifies road locations and related features, including information identifying intersections, types of roads (e.g., local roads vs. highways), traffic directionality permitted on roads, etc. The route generation engine 160 also can include or access database that provides real-time traffic conditions on the roads. The route generation engine 160 also can include or access a database comprising satellite or aerial imagery that can be utilized by the route generation engine 160 to generate maps and/or other visual representations of vehicle routes 170 (along with traffic conditions and other related information on landmarks, businesses, etc.).

The route generation engine 160 can execute various algorithms to compute vehicle routes 170 utilizing the data stored in the aforementioned databases and/or other databases. In some examples, the route generation engine 160 can utilize graph theory algorithms and/or other optimization algorithms to compute or identify the shortest vehicle route 170 between an origin location 171 and a destination location 172. Additionally, or alternatively, the route generation engine 160 also can utilize various algorithms to predict the fastest vehicle route 170 between an origin location 171 and a destination location 172 based on predicted traffic conditions.

The language model 140 can leverage the functionalities of the route generation engine 160 to identify or generate personalized vehicle routes 170 and/or operator sessions 175 that are optimized according to operator route preferences 180 learned by the language model 140. The manner in which the language model 140 and route generation engine 160 cooperate to generate these personalized vehicle routes 170 can vary.

In some cases, the route generation engine 160 can be configured to identify a multitude of candidate vehicle routes 170 between an origin location 171 and a destination location 172, and the language model 140 can select an optimal candidate vehicle route 170 that is most consistent with the operator route preferences 180 of a vehicle operator. Additionally, or alternatively, a communication exchange between the language model 140 and the route generation engine 190 can enable the two components to jointly cooperate in generating a custom vehicle route 170 based on the operator route preferences 180 for the vehicle operator. For example, in some cases, the language model 140 may inform the route generation engine 160 of certain operator route preferences 180 (e.g., such as preferences for pit stops at dining or other locations, preferences indicating when the pit stops are desired, preferences to maximize revenue, etc.), and the route generation engine 160 can generate one or more candidate vehicle routes 170 based on the operator route preferences 180. Further details on exemplary techniques that may be utilized to generate the vehicle routes 170 are discussed below.

In addition to personalizing individual vehicle routes 170, the language model 140 and route generation engine 160 can cooperate to personalize operator sessions 175. As mentioned above, each operator session 175 may include multiple vehicle routes 170. Each time a vehicle route 170 is completed and/or an additional vehicle routed is needed during the operator session 175, the vehicle route 170 can be jointly determined utilizing the techniques described herein.

Additionally, throughout a given operator session 175, the language model 140 can monitor various parameters that can impact or affect operator route preferences 180 associated with the vehicle operator and dynamically make recommendations or adjustments to provide the vehicle operator with the best experience. Examples of these dynamic functionalities used to personalize and improve the experience of a vehicle operator throughout an operator session 175 are provided below.

Consider a scenario where a dining preference 186 for a ride hailing vehicle operator indicates the operator prefers to take a lunch break at noon and prefers to eat at diner-type restaurant locations. During the operator session 175, the language model 140 may automatically select, or present the vehicle operator with an option for, a vehicle route 170 that has an expected drop off time around noon and a destination location 172 situated near the location of a diner. In some cases, the diner location selected by the language model 140 may be a diner that the vehicle operator has frequented in the past.

In another exemplary scenario, the language model 140 may learn operator route preferences 180 (e.g., road preferences 189 and/or revenue preferences 187) indicating that a ride hailing vehicle operator prefers driving on scenic routes (e.g., along a mountainside or near landmarks) rather than maximizing revenue. During the operator session 175, the language model 140 may automatically select, or present the vehicle operator with options for, passenger rides that have scenic views even if routes that are more profitable are available.

In another exemplary scenario, the language model 140 may learn operator route preferences 180 (e.g., such as distance preferences 182 and revenue preferences 187) indicating that a courier vehicle operator prefers to accept courier jobs with very short distances because the operator uses a non-motorized vehicle (e.g., a bicycle) and also that the operator desires to maximize revenue. During the operator session 175, the language model 140 may continuously calculate the best available vehicle routes 170 to maximize revenue while simultaneously ensuring that the vehicle routes 170 are feasible for a bicycle-type vehicle 115.

The above examples describe how the language model 140 can customize operator sessions 175 in connection with providing ride hailing or courier services.

However, it should be the understood that the operator session 175 can be customized in connection with providing many other types of services. Additionally, in many scenarios, the operator sessions 175 can be customized for a personal operator session 175 that are unrelated to providing any type of business or service.

Additionally, certain portions of this disclosure may describe the language model 140 and route generation engine 160 as being separate components for ease of understanding. However, it should be recognized that the functionalities of these components can be combined in any manner and, in some cases, a single component, function, or application can jointly perform the functions of both the language model 140 and route generation engine 160. Additionally, the configurations and/or implementations of these components can vary.

In certain embodiments, the language model 140 can include an AI or machine learning model that is trained to understand and generate human language. In some embodiments, the language model 140 can operate as chatbot that is configured to interpret inputs (e.g., requests, commands, questions, etc.) received via the client interface 135, and generate answers and/or responses that are output or displayed via the client interface 135.

In certain embodiments, the navigation application 130 can communicate with the language model 140 via an application programming interface (API) 142. For example, in some cases, the language model 140 can be developed or provided by a third-party (e.g., such as the ChatGPT service offered by OpenAI®) and the navigation application 130 can transmit inputs (e.g., voice and/or text-based inputs) received from vehicle operators to the API 142, and can receive responses from the language model 140 via the API 142. Additionally, or alternatively, the language model 140 can be integrated directly into the navigation application 130 and/or can be hosted by the application platform 150.

Various types of language models 140 can be utilized by the navigation application 130. In some embodiments, the language model 140 can include a generative pre-trained transformer (GPT) model 141 (e.g., a GPT-1, GPT-2, GPT-3, or subsequently developed GPT model). Additionally, or alternatively, the language model 140 can include a BERT (Bidirectional Encoder Representations from Transformers) model, an XLNet model, a RoBERTa (Robustly Optimized BERT pre-training approach) model, and/or a T5 (Text-to-Text Transfer Transformer) model. These or other types of machine learning or AI language models can be used to implement the language model 140. Additionally, it should be recognized that, in some embodiments, the language model 140 can represent a single model and, in other embodiments, the language model 140 can be comprised of multiple learning models (including any combination of the aforementioned models) that cooperate together.

In some cases, a vehicle operator can provide text inputs and/or voice inputs to interact with the language model 140. For example, a vehicle operator may provide text inputs via a touch screen, physical keyboard, digital keyboard, or by other means. Additionally, a vehicle operator can provide voice inputs (or audio-based inputs) via a microphone included on a computing device 110 that is operated by the user. In some embodiments, speech recognition software can be executed to convert the voice inputs to text inputs, which can then be provided to the language model 140. When a vehicle operator interacts with language model 140, the input initially can be tokenized into a sequence of words (or sub-words), which are then processed by the language model 140 to generate a response.

In certain embodiments, the language model 140 can include a transformer neural network architecture 143 that includes a self-attention mechanism, which allows the model to weigh the importance of different parts of the input when generating its output or response. The self-attention mechanism allows the model to selectively focus on different parts of the input when generating its output or response, rather than relying on a fixed context window like other language models. Additionally, the transformer neural network architecture 143 can include a series of layers, each of which applies self-attention and other types of neural network operations on a given input that is received. The layers can be arranged in a stacked configuration, such that the output of one layer is fed as input to the next layer, thereby allowing the model to gradually refine its representation of the input as it is processed through the layers.

Various types of training procedures 144 can be utilized to train the language model 140. In some cases, one or more supervised or semi-supervised training procedures 144 can be utilized to train the language model 140. Additionally, or alternatively, one or more unsupervised training procedures 144 can be utilized to train the language model 140.

In some embodiments, the language model 140 is trained via a self-supervised training procedure 144 that includes both an unsupervised training phase and a supervised training phase. The unsupervised training phase can include a pre-training step in which the language model 140 is trained on a large corpus of text to learn patterns and relationships between words, phrases, sentences, and/or other human language elements. The supervised training phase can be used for fine-tuning and can train the language model 140 using one or more labeled datasets to facilitate learning of specific natural language processing (NLP) tasks, such as language translation, language generation, question answering, text classification, text summarization, etc. In certain embodiments, the training datasets 146 can be derived from a text corpus accumulated from multiple sources, such as web pages, books, academic articles, news articles, and/or other text-based works.

In some embodiments, the training datasets 146 can be customized or supplemented with domain-specific textual content relating to navigation functionalities, and a transfer learning procedure 145 can be executed to fine-tune the training of the language model 140 on the domain-specific textual content. For example, the training dataset 146 can be supplemented with text relating creating new vehicle routes 170 and/or modifying vehicle routes 170 for ongoing trips (e.g., text that enables the language model 140 to understand parameters for origin locations 171, destination locations 172, and/or any operator route preferences 180 described throughout this disclosure). The training dataset 146 also can be supplemented with text corresponding to historical user interactions related to planning and/or modifying vehicle routes 170 (e.g., previous interactions between vehicle operators and the language model 140 or third-party applications). Using this domain-specific content to supplement the training of the language model 140 can significantly improve communications between the language model and vehicle operators, as well as communications between the language model 140 and route generation engine 160.

In some examples, the navigation application 130 can execute ride hailing functions in connection with offering ride hailing services, and the training dataset 146 can be supplemented with textual content that enables the language model 140 to understand various concepts related to provide ride-hailing services including: origin locations 171 for rides (e.g., pickup locations); destination locations 172 for rides (e.g., drop off locations); intermediate or pit stops during rides; route modification commands during rides; passenger classifications (e.g., based on ratings provided by vehicle operators); revenue generating options for the vehicle operators (e.g., options that enable vehicle operators to pick up passengers in geographic regions where prices are surging due to increased demand); various scheduling options and pricing rates (e.g., options to receive a driver more rapidly in exchange for paying a higher rate or options to receive a driver less rapidly in exchange for paying a lower rate); vehicle options for rides (e.g., a sedan, van, or sports utility vehicle); special vehicle accessories (e.g., for vehicles with baby seats, bike racks, or other vehicle accessories); vehicle sharing options (e.g., options that enable passengers to share rides with other passengers); and/or other options that are related to providing ride hailing services.

The ability of the language model 140 to learn these domain-specific concepts enables the language model 140 to more accurately interpret the meaning of inputs provided by ride hailing vehicle operators which, in turn, enables the language model 140 to more effectively communicate with the route generation engine 160 to generate personalized vehicle routes for the ride hailing vehicle operators. Additionally, in some scenarios where the navigation application 130 provides ride hailing functionalities, passengers also can be provided with a client interface 135 that enables them to communicate with the language model 140 in connection with scheduling rides or vehicle operators. The domain-specific dataset 146 described above also can improve the ability of the language model 140 to communicate with the passengers in these scenarios as well.

Thus, in some embodiments, the aforementioned self-supervised training procedure can initially be applied to train the language model 140. Thereafter, a transfer learning training procedure 145 can be executed to fine-tine the training of the language model 140 (or an associated sub-model) using a domain-specific dataset as described above.

Additionally, in certain embodiments, the language model 140 can include or communicate with a continuous learning (or incremental) learning framework 147 that enables the language model 140 to continuously learn over time based on interactions with vehicle operators. For example, in some embodiments, the continuous learning framework 147 can enable the language model 140 to improve responses or communications output to vehicle operators via the client interface 135 and/or improve communications with the route generation engine 160 for identifying and personalizing vehicle routes 170 and/or operator sessions 175.

The continuous learning framework 147 also can enable the language model 140 to recall historical interactions with vehicle operators, and utilize the historical interactions to customize vehicle routes 170 and/or operator sessions 175 for vehicle operators. For example, in certain embodiments, the continuous learning framework 147 can enable the language model 140 to continuously learn and refine the aforementioned operator route preferences 180 and/or operator route preferences 180 based on historical interactions with vehicle operators. The language model 140 can then customize vehicle routes 170 and/or operator sessions 175 for vehicle operators based on the operator route preferences 180.

In one example, the navigation application 130 can provide ride hailing functions and the continuous learning framework 147 can enable the language model 140 to learn operator route preferences 180 for providing passenger rides during a ride hailing operator session (e.g., such as revenue preferences 187, passenger preferences 188, road preferences 189 etc.). When the vehicle operator interacts with the language model 140 during a ride hailing operator session 175, the language model 140 can communicate with an operations engine and/or backend of the application to identify candidate rides that match the operator route preferences 180 of the vehicle operator.

Figure 3:
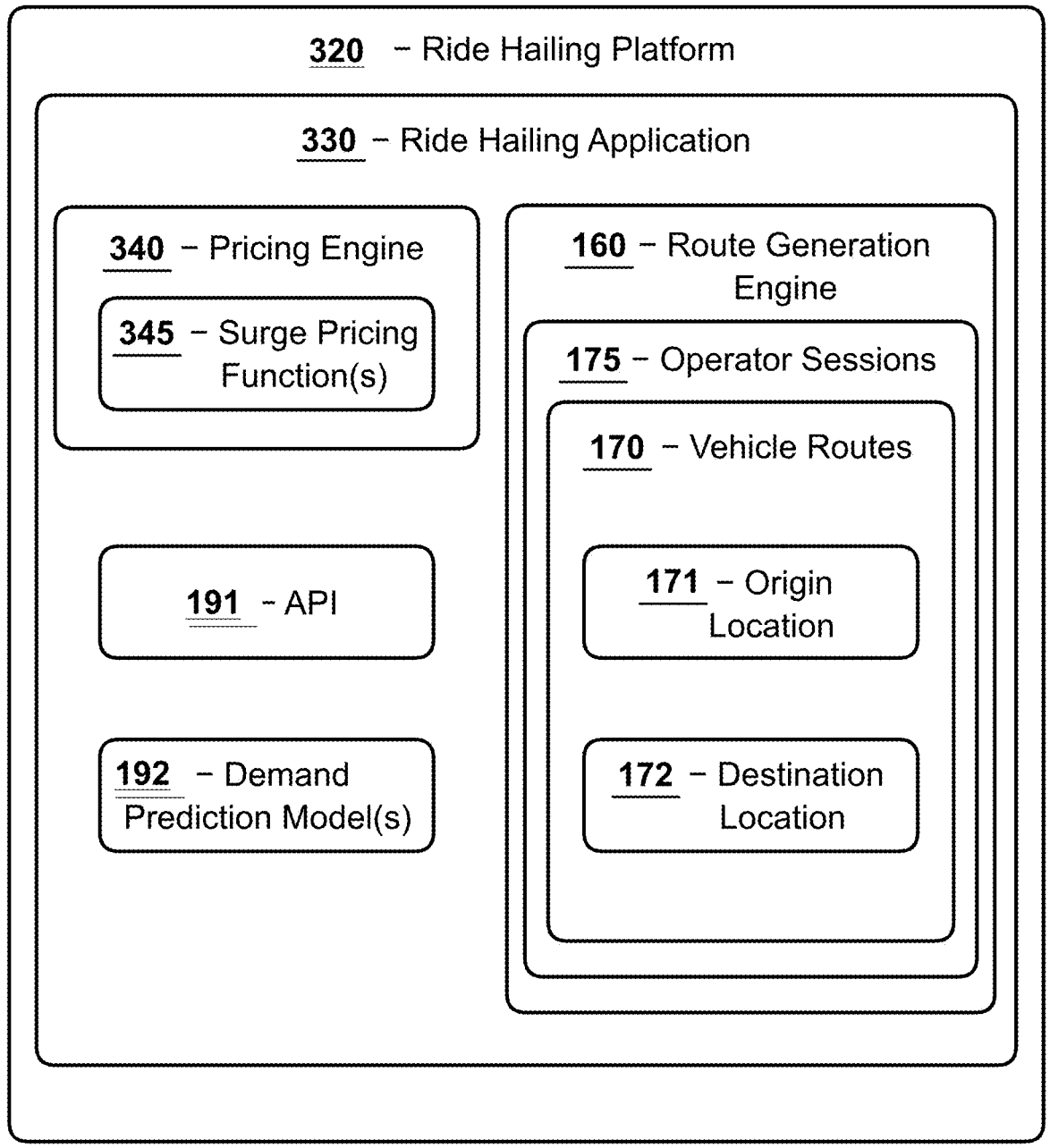
FIG. 3 is a block diagram demonstrating exemplary features of a ride hailing platform in accordance with certain embodiments.

FIG. 3 is a block diagram illustrating exemplary features of ride hailing platform 320 according to certain embodiments. In scenarios where the navigation application 130 is configured to ride hailing service functionalities, the navigation application 130 may represent a ride hailing application 330 and the application platform 150 may represent a ride hailing platform 320 that hosts the ride hailing application 330. Thus, the same or similar functionalities of the components in FIGS. 1A and 1B can also be applied to the ride hailing platform 320 in FIG. 3.

A back-end of the ride hailing application 330 can include an operations engine that is configured execute functions associated with connecting passengers with vehicle operators, determining prices for the rides, and/or fulfilling or scheduling passenger requests for rides. In certain embodiments, the operations engine also can be configured to manage and monitor available inventory (e.g., vehicles 115 or vehicle operators), and allocate the inventory to fulfill requests or orders placed by passengers. In some cases, the ride hailing application 330 may include an API 191 that enables the language model 140 to communicate with the operations engine and/or back-end of the ride hailing application 330 (e.g., in connection obtaining available vehicle routes 170 and revenue options for passenger rides).

Vehicle operators can access a front-end of the ride hailing application 330 on computing devices 110 operated by the vehicle operators. For example, the vehicle operators can communicate with a language model 140 via a client interface 135 provided via the front-end of the ride hailing application 330 for various reasons, such as to initiate a ride hailing operator session 175, personalize vehicle routes 170 during the operator sessions 175, accept or deny passenger requests for rides, and/or terminate ongoing operator sessions 175.

In certain embodiments, the back end of the ride hailing application 330 includes a pricing engine 340 that is configured to determine pricing for various service options related to scheduling rides. For example, the pricing engine 340 can determine pricing for rides based on variety of service options such as pickup times (e.g., such that rides with urgent pickup times have increased prices relative to rides with more extended pickup times), vehicle types for rides (e.g., sedans, sports utility vehicles, limousines, etc.), sharing options (e.g., indicating whether or not the ride will be shared among multiple passengers having differing destination locations), special vehicle accessories (e.g., baby seats, wheelchair lifts, etc.), etc.

In some embodiments, the pricing engine 340 can execute a surge pricing function 345 that is configured to determine and/or adjust prices for rides based, at least in part, on an available supply and/or demand for the vehicles 115 or vehicle operators. The surge pricing function 345 can dynamically adjust prices for the rides (and corresponding service options) as the supply and/or demand changes over time.

The manner in which the ride hailing application 330 determines or predicts the demand for the ride hailing services can vary. In certain embodiments, the back end of the ride hailing application 330 includes a demand prediction model 192 that determines or predicts the demand, at least in part, by monitoring a level or number of requests or orders placed by passengers via ride hailing applications 330 installed on the computing devices 110 operated by the passengers. The ride hailing application 330 also can monitor the locations (e.g., global positioning system or GPS coordinates) of computing devices 110 that have installed the ride hailing application 330, and determine a number or population of individuals (e.g., passengers) in each of a plurality of geographic regions. This user location or user density information also can be utilized by the demand prediction model 192 to determine or predict the demand for ride hailing services in each of the geographic regions. In some embodiments, the demand prediction model 192 can include one or more pre-trained machine learning models that are configured to determine or predict the demand for the ride hailing services.

The manner in which the ride hailing application 330 determines or predicts the supply of vehicles 115 or vehicle operators can vary. In some cases, the ride hailing application 330 can maintain a database that tracks the supply of vehicles 115 or vehicle operators (e.g., based on vehicle operators who have initiated an operator session 175 for providing ride hailing services). This database can be dynamically updated as passengers submit requests for rides and/or as those requests are fulfilled or completed.

The surge pricing function 345 can utilize these metrics or predictions related to the supply and/or demand for ride sharing services to dynamically adjust prices for rides. When passengers access the ride hailing application 330, the available rides (and related service options) can be displayed with prices determined by the surging pricing function 345 and the passengers can select desired options to request a ride. When vehicle operators access the ride hailing application 330, the rides requested by passengers can be displayed with prices determined by the surging pricing function 345 and the vehicle operators may accept one or more of the requested rides (e.g., either manually or with the assistance of the language model 140 described herein).

Returning to FIGS. 1A-1B, vehicle operators can interact with the language model 140 in various ways to customize vehicle routes 170 and/or perform other related functions. The language model 140 can be configured interpret inputs (e.g., questions, statements, requests) received from the vehicle operators via the client interface 135, and to communicate with the route generation engine 160 to identify or generate personalized vehicle routes 170, which can be provided to the user via the client interface 135.

In one scenario, a vehicle operator can communicate a request to the language model 140 for directions to a destination location 172 without providing any other parameters. In this example, the language model 140 may automatically identify an origin location 171 for the vehicle route 170 based on the vehicle operator's location (e.g., based on GPS or location software installed on the computing device 110 operated by the vehicle operator). The language model 140 also may obtain the operator route preferences 180 learned from operator interaction data 149 generated in connection with previous activities of the vehicle operator. The language model 140 can communicate with the route generation engine 190 to personalize the vehicle route 170 generated for the vehicle operator.

In another scenario, the request for directions to a destination location 172 can specify one or more operator route preferences 180, which can be utilized by the language model 140 in combination with previously learned operator route preferences 180 to generate a personalized vehicle route 170. Consider an example in which the navigation application 130 is a ride hailing application 330, and a vehicle operator requests a vehicle route 170 that enables the operator to pick up a passenger having a destination address near a particular restaurant where the vehicle operator wishes to dine. In this scenario, based on from previous interactions with the vehicle operator, the language model 140 also may have previously learned operator route preferences 180 indicating that the vehicle operator is only willing to transport passage that have a highest rating (e.g., a 5-star rating) and that the vehicle operator commonly seeks to maximize revenue. In response to receiving the request from the vehicle operator, the language model 140 can communicate with the route generation engine 160 to generate or identify a personalized vehicle route 170 that jointly considers both the operator route preferences 180 specified in the request and the operator route preferences 180 previously learned by the language model 140.

In certain embodiments, after a vehicle route 170 has been selected, the navigation application 130 can execute real-time route guidance functions 190, which can guide the vehicle operator along the selected vehicle route 170. In many cases, the real-time route guidance functions 190 can generate a map display for output via the client interface 135, which can be dynamically updated to display the location the operator's vehicle 115 along the selected vehicle route 170. The real-time route guidance functions 190 can provide the vehicle operator with turn-by-turn directions destination locations.

In some scenarios, a vehicle operator can communicate with the language model 140 to modify a vehicle route 170 during on ongoing voyage. For example, after a vehicle operator has initiated a trip along a personalized vehicle route 170, the vehicle operator can communicate with the language model 140 to request various modifications (e.g., alternate roads, pit stops, etc.) to the vehicle route 170 for any number of reasons (e.g., the vehicle operator witnessed an accident that has caused high-traffic conditions and/or the vehicle operator decided to change plans). In response to receiving the request, the language model 140 can initiate a communicate exchange with the route generation engine 160 to identify an alternative vehicle route 170. This alternative vehicle 170 can be personalized based on personalized based on operator route preferences 180 identified in the modification request and/or based on operator route preferences 180 previously learned by the language model 140.

Figure 2:
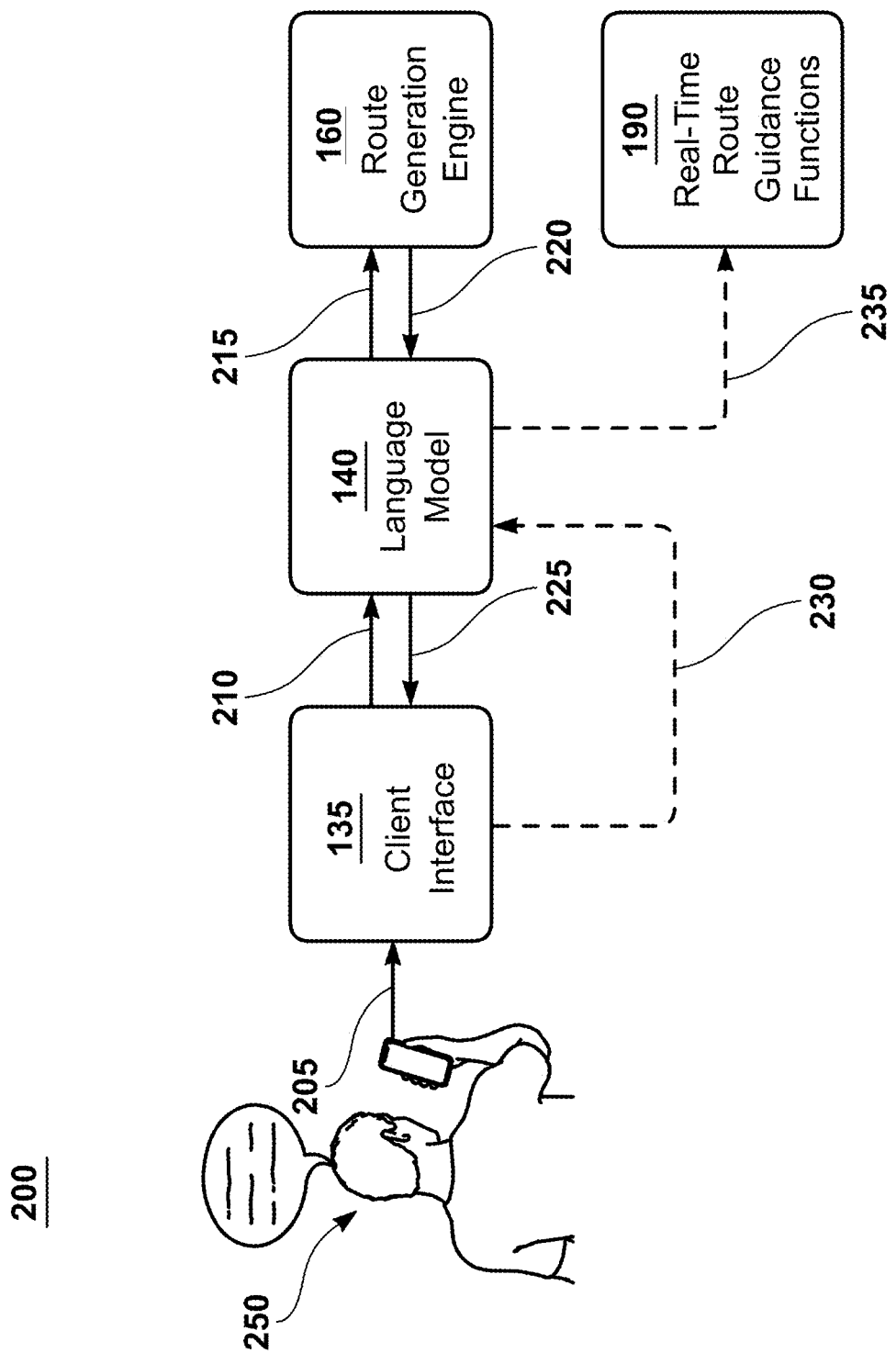
FIG. 2 is a block diagram illustrating an exemplary process flow for determining an optimum driving route based on operator preferences in accordance with certain embodiments.

FIG. 2 is block diagram that illustrates an exemplary process flow 200 demonstrating how the language model 140 can operate as an intermediary between a client interface 135 and an route generation engine 160 to generate personalized vehicle routes 170 according to certain embodiments.

At step 205, a vehicle operator 250 provides one or more inputs via a client interface 135 of navigation application 130. The one or more inputs can include one or more text inputs and/or one or more voice or audio inputs. The one or more inputs can include a request for a vehicle route 170 and/or a request to initiate an operator session 175. In some embodiments, the one or more inputs can identify an origin location 171 and/or a destination location 172 for the vehicle route 170. The one or more inputs also can identify one or more operator route preferences 180 for the vehicle route 170 in some cases (e.g., preferences for scenic views, intermediate stops, etc.).

In one example, a vehicle operator 250 can submit an input that requests a vehicle route 170 to Destination X with an intermediate stop at a restaurant to grab food along the way to Destination X. The input does not specify a particular location or type of food for the intermediate stop.

At step 210, the input received via the client interface 135 is provided to language model 140. In some cases, the input may be provided via an API 142 of the language model 140 (e.g., transmitted over a network 105 to a server 120 that hosts the language model 140). Additionally, or alternatively, the language model 140 can be integrated directly with the client interface 135 and/or a front-end of the user application 130. Upon receiving the input, the language model 140 can analyze the input to interpret its meaning and/or to understand the intentions of the vehicle operator.

Staying with the above example, the language model 140 can analyze the input to understand the vehicle operator is requesting generation of a vehicle route 170. The language model 140 also can analyze the input to identify the destination location (Destination X) for the vehicle route 170 and the operator route preference 180 for an intermediate stop at a restaurant. Before the request is submitted, the language model 140 may have already learned various operator route preferences 180 for the vehicle operator. In this example, suppose that the language model 140 has previously identified operator route preferences 180 indicating that the vehicle operator wishes to avoid Road Y and the vehicle operator likes to dine at Restaurants A, B, C, and D.

At step 215, the language model 140 initiates a communication exchange with the route generation engine 160 and, at step 220, the route generation engine 160 generates responses identifying potential or candidate vehicle routes. In some cases, there may be several exchanges between the language model 140 and the route generation engine 160 to identify an optimized or personalized vehicle route for the vehicle operator 250.

As mentioned above, the route generation engine 160 can store or access detailed road-mapping information, and can execute various algorithms to compute many different vehicle routes between the origin location 171 and the destination location 172 for the vehicle route 170 being requested by the vehicle operator. The communication exchange between the language model 140 and the route generation engine 160 enables identification or selection of a personalized vehicle route 170 for the vehicle operator. The personalized vehicle route 170 can be customized or optimized based on operator route preferences 180 specified in the input provided by the vehicle operator and/or based on operator route preferences 180 previously learned by the language model 140.

Staying with the above example, the language model 140 can communicate with the route generation engine 160 to identify a vehicle route to Destination X that satisfies the operator route preferences 180. The route generation engine 160 may initially identify a vehicle route 170 having the shortest distance or shortest estimated time duration to Destination X, and the language model 140 may communicate with the route generation engine 160 to modify or personalize the route based on the operator route preferences 180 for an intermediate stop at a restaurant and to avoid Road A. For example, if the initial route generated by the route generation engine 160 included a segment on Road A, the language model 140 can communicate with the route generation engine 160 to identify an alternative road (e.g., which may be the next fastest pathway to the destination). Likewise, because the language model 140 previously learned that the vehicle operator enjoys dining at Restaurants A, B, C, and D, the language model 140 can communicate with the route generation engine 160 to modify a segment of the vehicle route 170 to allow for an intermediate stop at one of these restaurants (e.g., perhaps Restaurant C which is located in the direction of the destination location).

At step 225, the language model 140 provides the personalized vehicle route 170 to the client interface 135 for presentation to the vehicle operator. In some cases, the client interface 135 can include interactive options (e.g., buttons) that enable the vehicle operator to accept and/or decline the proposed vehicle route 170. The vehicle operator also can accept and/or decline the proposed vehicle route 170 by providing a human language response to the language model 140.

In the event that the vehicle operator is not satisfied with the proposed vehicle route 170, the end vehicle operator can submit a second input to the language model 140 to request a new vehicle route 170 and/or modifications to the proposed vehicle route 170. In this scenario, the process may repeat steps 205 through 225 to determine alternative vehicle routes 170. For example, if the vehicle operator does wish to dine at Restaurant C which is included on the initially proposed vehicle route 170, the vehicle operator can submit a second input revising the initial criteria (e.g., specifying a preference to dine at Restaurant B even if it more out of the way).

At step 230, the vehicle operator 250 can optionally accept a personalized vehicle route 170 presented via the client interface 135 and the selection can be transmitted to the real-time route guidance function 190 at step 235. In some cases, the selection made by the vehicle operator 250 can be transmitted to the language model 140, which can relay the selection to the real-time route guidance function 190. Alternatively, the selection can be transmitted directly from the client interface 135 to the real-time route guidance function 190.

Upon receiving the selection, the real-time route guidance function 190 can execute functions for guiding the vehicle operator to the destination location 172. In some cases, the real-time route guidance function 190 can display the selected, personalized vehicle route 170 as an overlap on map, and the location of the operator's vehicle 115 can be dynamically updated on the map as the vehicle 115 traverses the vehicle route 170. In many cases, the real-time route guidance function 190 can provide turn-by-turn instructions (e.g., via audio and/or text) guiding the vehicle operator to the destination location along with the vehicle route 170.

Staying with the above example, if the vehicle operator selects or accepts a personalized vehicle route 170 presented via the client interface 135, the real-time route guidance function 190 can be utilized to guide the vehicle operator to Destination X along the vehicle route.

In some scenarios, the above-described process flow 200 for generating a personalized route can be executed multiple times in connection with optimizing vehicle routes 170 during an operator session 175. For example, the process flow 200 may be executed continuously throughout the duration of the operator session 175. Similar communication techniques between the language model 140 and route generation engine 160 also can be applied to customize operator route preferences 170 more globally for the operator session 175 itself, in addition to the individual vehicle routes 170 involved with the operator session 175.

FIGS. 5A-5F are illustrations demonstrating exemplary techniques that may be utilized to identify a personalized vehicle route 170 in accordance with certain embodiments. Amongst other things, this example demonstrates how various operator route preferences 180 can be considered in selecting or generating a personalized vehicle route 170 for a vehicle operator. While the discussion of these figures includes an example relating to personalizing a vehicle route 170 for a ride hailing vehicle operator, it should be understood that similar techniques can be applied to customize vehicle routes 170 in other contexts.

Figure 5A:
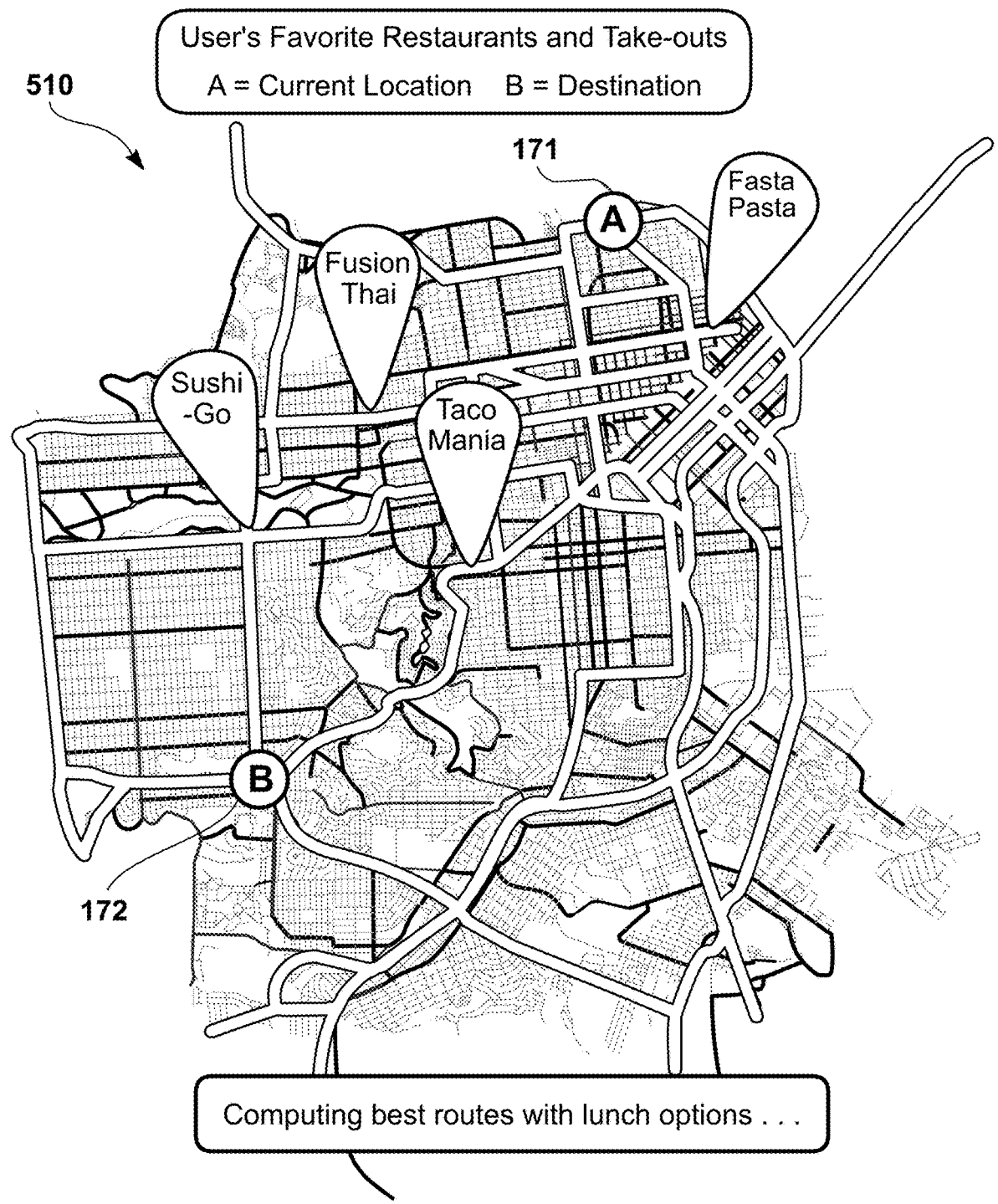
FIG. 5A is an illustration of a system calculating optimal or personalized vehicle routes in accordance with certain embodiments.

As shown illustrated in FIG. 5A, an input is received by the language model 140 requesting a vehicle route 170 from an origin location 171 (labeled A) to a destination location 172 (labeled B). In some instances, the vehicle route 170 may represent a vehicle route 170 that can be utilized in connection with providing ride hailing services (e.g., which may involve picking up one or more passengers along the vehicle route). Amongst other things, the vehicle route 170 can be personalized based on an intermediate stop preference 185 to stop for lunch during the vehicle route 170. In some cases, the intermediate stop preference 185 may be explicitly specified in the input provided by the vehicle operator. In other scenarios, the intermediate stop preference 185 may be a preference previously learned by the language model 140 (e.g., based on previous activity patterns of the vehicle operator).

A map 510 displays a geographic region that includes the origin location 171 and destination location 172. The map 510 also displays locations of dining preferences 186 for the vehicle operator that the language model 140 has learned by feeding the language model 140 with operator interaction data 149 collected for the vehicle operator. Many different vehicle routes 170 are available for the vehicle operator to take between the origin location 171 and the destination location 172.

Figure 5B:
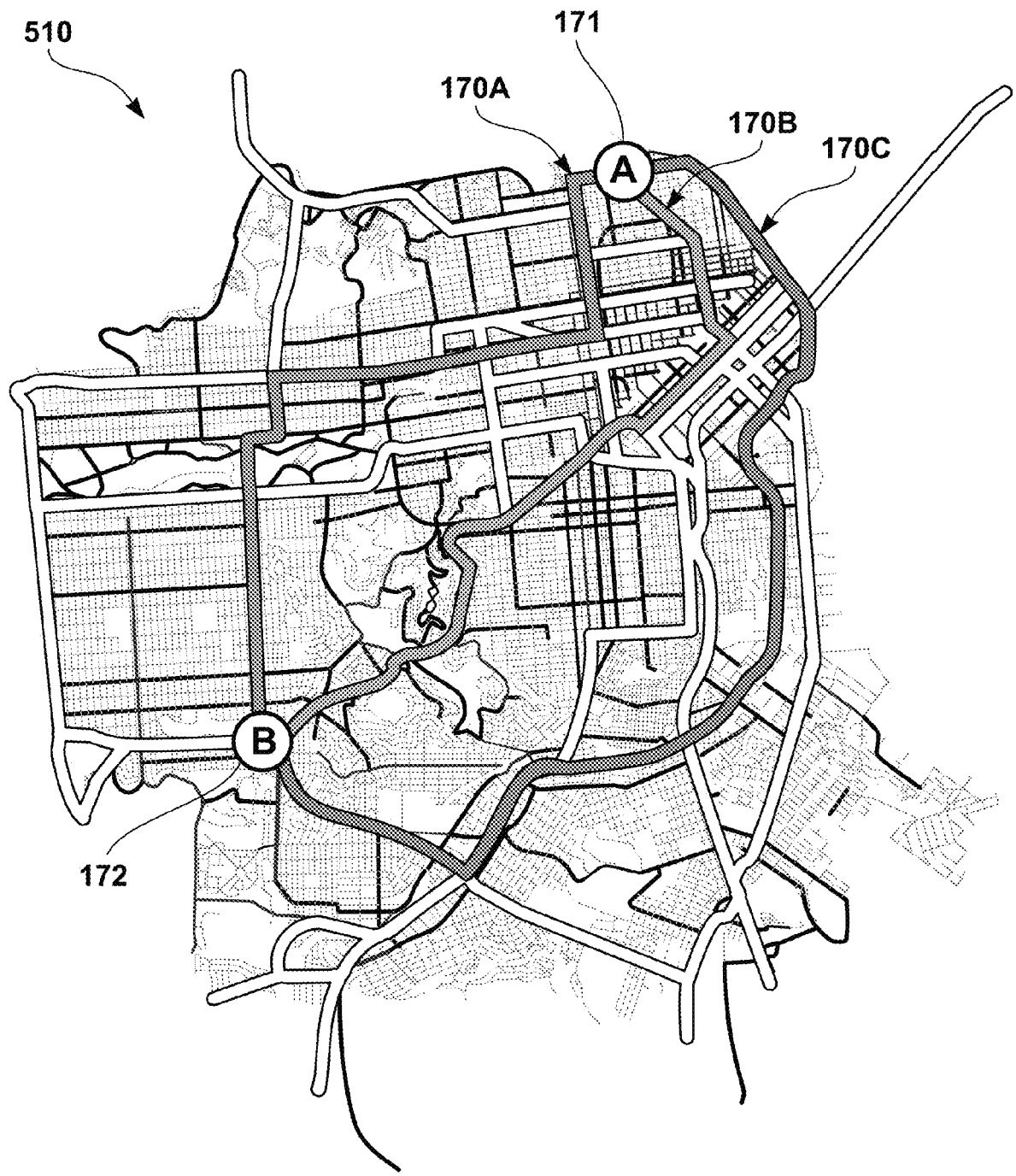
FIG. 5B is an illustration of geographic map displaying candidate driving routes identified by a route generation engine in accordance with certain embodiments.

As illustrated in FIG. 5B, the language model 140 can communicate with the route generation engine 160 to identify an optimal vehicle route 170 between the origin location 171 and the destination location 172. Based on a comprehensive knowledge of roadways, the route generation engine 160 may compute multiple candidate vehicle routes 170 and transmit the candidate vehicle routes 170 to the language model 140 for consideration. In this example, a first candidate vehicle route 170A is illustrated in green, a second candidate vehicle route 170B is illustrated in orange, and a third candidate vehicle route 170C is illustrated in blue.

As explained above, the language model 140 can be trained to learn and store various types of operator route preferences 180 for the vehicle operator including, but not limited to, the ride duration preferences 181, distance preferences 182, operating area preferences 183, fuel preferences 184, intermediate stop preferences 185, dining preferences 186, revenue preferences 187, passenger preferences 188, and road preferences 189 discussed above.

Upon receiving the candidate vehicle routes (170A-170B) from the route generation engine 160, the language model 140 may conduct a correlation analysis that evaluates each of the routes based on these and other operator route preferences 180.

Figure 5C:
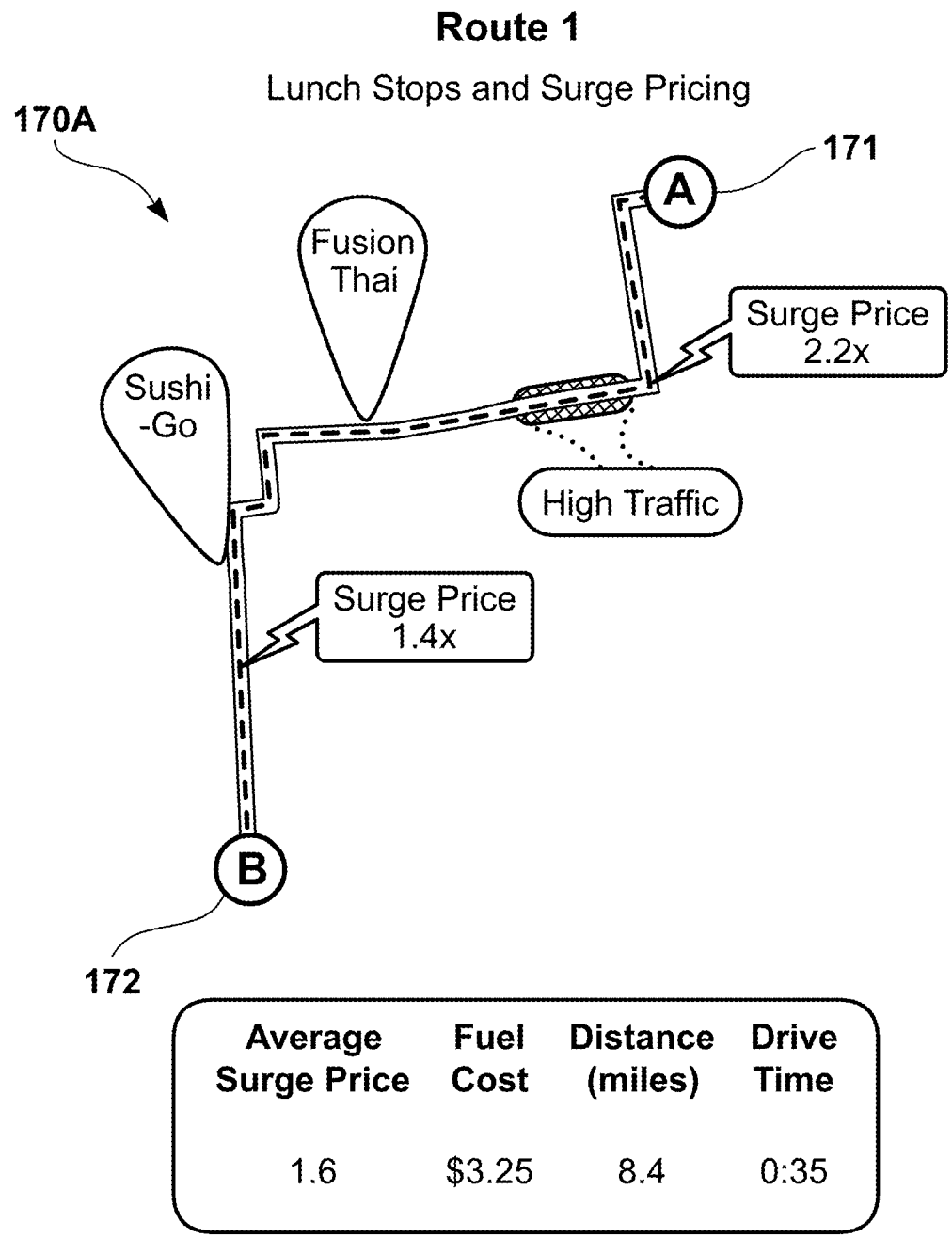
FIG. 5C is a detailed view of a first candidate driving route in accordance with certain embodiments.
Figure 5D:
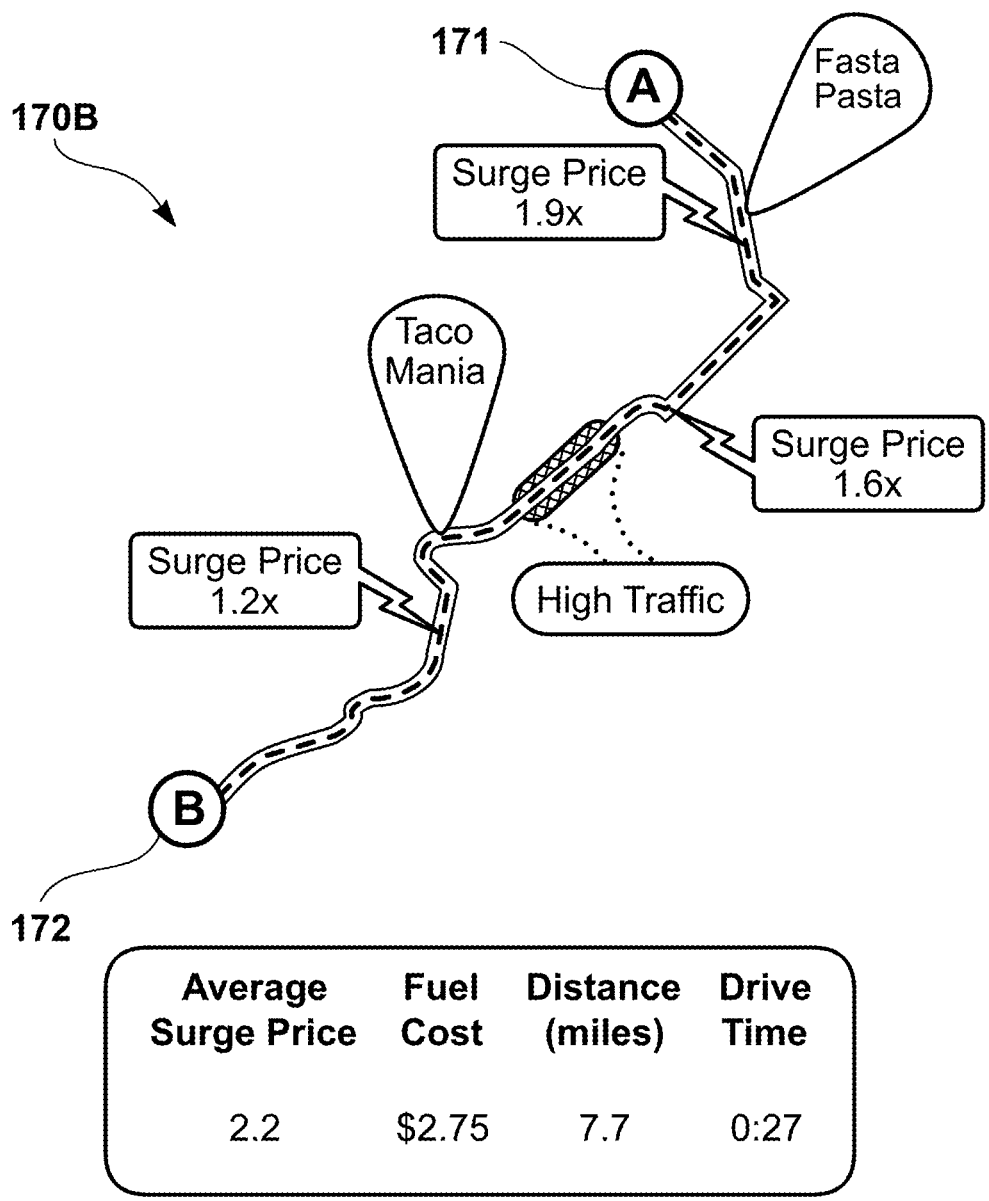
FIG. 5D is a detailed view of a second candidate driving route in accordance with certain embodiments.
Figure 5E:
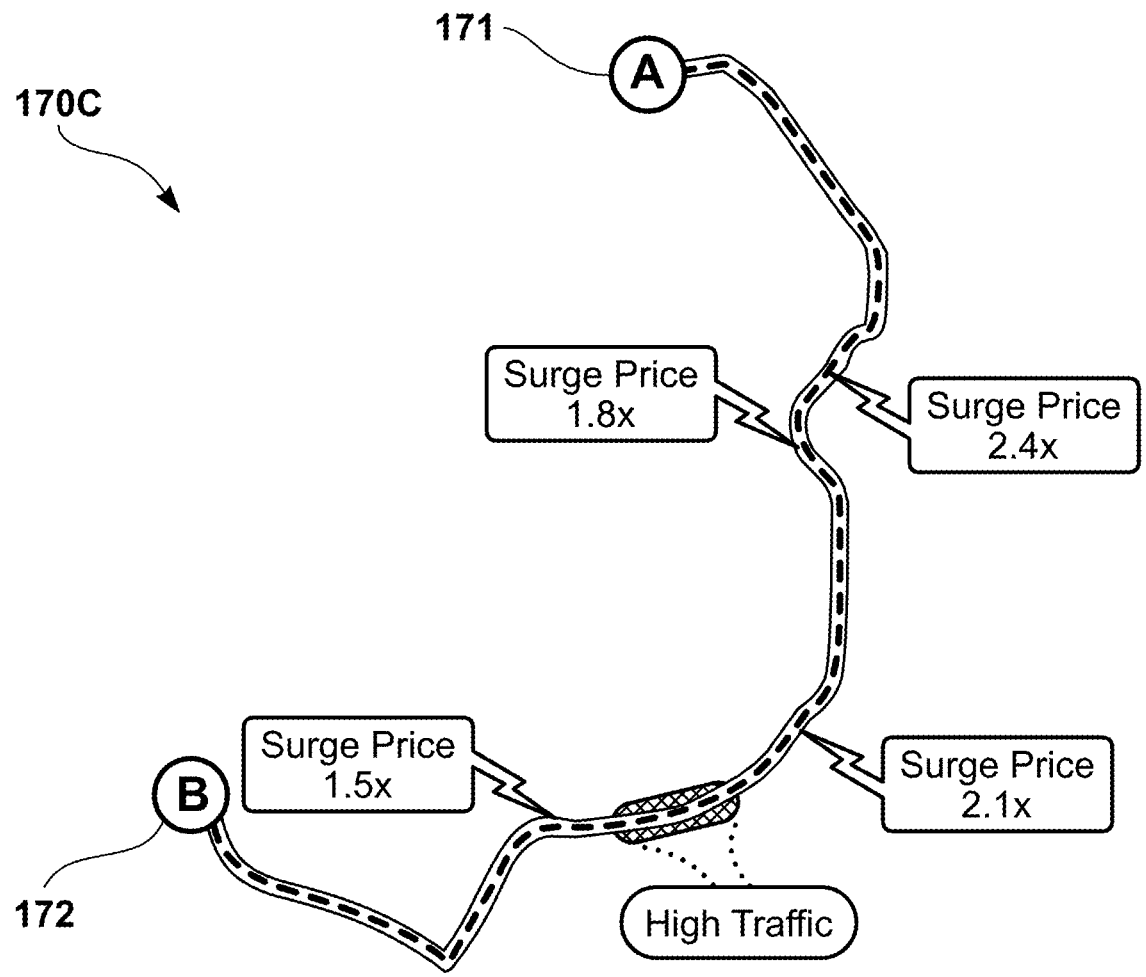
FIG. 5E is a detailed view of a third candidate driving route in accordance with certain embodiments.

FIGS. 5C-E provide detailed views of the three candidate vehicle routes (170A-170C) computed by the route generation engine 160, along with various conditions that can affect the operator route preferences 180 of the vehicle operator. The language model 140 can consider the conditions of each candidate vehicle route and select the candidate vehicle route that best matches the operator route preferences 180 of the vehicle operator. In doing so, the language model 140 may conduct an in-depth, granular analysis of the conditions for each of the routes 170A-170C to identify the operator route preferences 180 that are available on each of the routes 170A-170C. In some cases, this can include determining when the operator route preferences 180 are available or become available on the routes (e.g., when surge pricing is like to be implemented on the routes, when dining locations are opened for business, when a reservation or seating will become available at the dining location, when high-traffic conditions are expected, etc.). By considering the locations and timing information associated with the operator route preferences 180 on each route, the language model 140 can select that best route which actually matches the operator route preferences 180 of the vehicle operator in a meaningful or practical manner.

Consider an example in which an analysis of a first route reveals that surge pricing is applied twenty percent of the route near a beginning segment of the route, a preferred dining option is located on an ending segment of route, and preferred dining option is located approximately one hour away on the route. Also consider a second route in which surge pricing is applied sixty percent of the route near a middle segment of the route, a preferred dining option is located along the middle segment, and the preferred dining option is located approximately twenty minutes away on the route. Based on analysis of the operator route preferences 180 for the vehicle operator, the language model 140 may determine that the first route is more preferable for a vehicle operator because it would be difficult for the operator to stop at the dining option along the second route (e.g., because it is located along a surge pricing segment of the second route) and/or because the vehicle operator's typical mealtime is in one hour. By selecting the first route, the vehicle operator can take advantage of the increased passenger fares on the first segment of the route and arrive at a dining location during a preferred mealtime, thereby optimizing the experience of the vehicle operator.

FIG. 5C demonstrates that the first candidate vehicle route 170A comprises two portions that are subject to increased passenger fares due to surge pricing considerations, which can help to maximize the revenue generated by the vehicle operator. A portion of this candidate vehicle route 170A is subject to high-traffic conditions, which can frustrate the driving experience of the vehicle operator). Additionally, this candidate vehicle route 170A includes two dining options that the vehicle operator prefers (e.g., Fusion Thai and Sushi-Go).

FIG. 5D demonstrates that the second candidate route 170B comprises three portions that are subject to increased passenger fares due to surge pricing considerations, and another portion that has high-traffic conditions. This candidate vehicle route 1706 includes two alternative dining options that the vehicle operator prefers (e.g., Fasta Pasta and Taco Mania).

FIG. 5E demonstrates that a third candidate route 170C comprises four portions that are subject to increased passenger fares due to surge pricing considerations, and another portion that has high-traffic conditions. This candidate vehicle route 170C does not include any dining options that the vehicle operator prefers.

In assessing these candidate vehicle routes (170A-170C), the language model 140 can consider the aforementioned conditions relating to surge pricing fares, high-traffic conditions, and availability of options to eat lunch. Additionally, the language model 140 may consider a variety of other factors, such as the fuel costs, distance, and/or drive times or durations associated with the each of the routes. The language model 140 can perform a correlation analysis that compares the conditions of each candidate vehicle route with the operator route preferences 180 learned by the language model 140. The language model 140 can then select the candidate vehicle route that best matches the operator route preferences 180 of the vehicle operator.

Figure 5F:
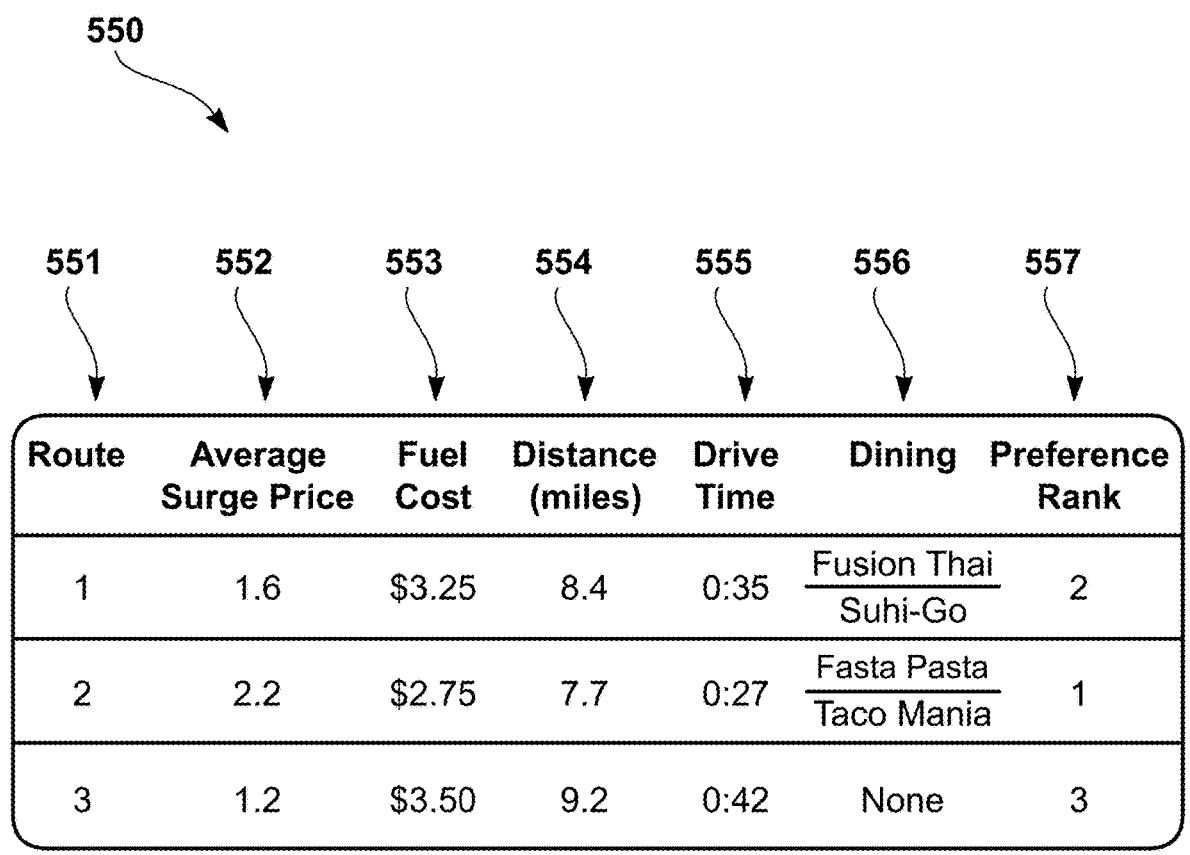
FIG. 5F is a chart summarizing metrics for a plurality of candidate driving routes in accordance with certain embodiments.

FIG. 5F is a chart 550 that displays the results of an exemplary correlation analysis utilized to evaluate the candidate vehicle routes (170A-170C) identified by the route generation engine 160. While this chart 550 displays various route conditions that can be considered by the language model 140, it should be understood that these are intended as examples and many other conditions can additionally (or alternatively be considered), A first column 551 of the chart 550 includes an identifier for each of the candidate vehicle routes (170A-170C). A second column 552 of the chart 550 identifies an average surge price for each of the candidate vehicle routes (170A-170C). A third column 553 of the chart 550 identifies an estimated fuel cost for each of the candidate vehicle routes (170A-170C). A fourth column 554 of the chart 550 identifies a distance for each of the candidate vehicle routes (170A-170C). A fifth column 555 of the chart 550 identifies a drive time or duration for each of the candidate vehicle routes (170A-170C). A sixth column 556 of the chart 550 identifies available dining options for each of the candidate vehicle routes (170A-170C). A seventh column 557 of the chart 550 identifies a rank for each of the candidate vehicle routes (170A-170C).

In certain embodiments, the correlation analysis executed by the language model 140 can generate the rank for each of the candidate vehicle routes based on scores that are generated for each of the routes. For example, a separate score may be generated for each candidate route based on a comparison of the route conditions with the operator route preferences 180 of the vehicle operator. These scores can then be utilized to rank the candidate vehicle routes, and select the optimize candidate based on the ranking.

The manner in which these ranks or scores are computed can vary. In one example, a weighted combination function can be utilized to compute a score for each candidate vehicle route. The weighted combination function can include variables corresponding to the operator route preferences 180, and the values of the variables can be populated with the values derived from the detected conditions for a given candidate route. The weighted combination function also can assign a weight to each of the operator route preferences 180 (or corresponding variables) reflecting the importance of each operator route preference 180 to a given vehicle operator. The values of these importance weights can be learned by the language model 140 based on interactions with the vehicle operator. After a score is calculated for each candidate vehicle route, the routes can be ranked based on the scores, and the highest ranked candidate vehicle route can be selected by the language model 140. Other techniques for scoring or ranking the candidate vehicle routes also may be utilized.

In this example, the second candidate vehicle route 170B is determined to be the optimal route based on the operator route preferences 180 for the vehicle operator (e.g., which, in this case may, be based on a heavy importance or preference of the vehicle operator to maximize revenue and eat at a preferred dining location).

FIG. 6 illustrates a flow chart for an exemplary method 600 according to certain embodiments. Method 600 is merely exemplary and is not limited to the embodiments presented herein. Method 600 can be employed in many different embodiments or examples not specifically depicted or described herein. In some embodiments, the steps of method 600 can be performed in the order presented. In other embodiments, the steps of method 600 can be performed in any suitable order. In still other embodiments, one or more of the steps of method 600 can be combined or skipped. In many embodiments, system 100, navigation application 130 and/or application platform 150 can be configured to perform method 200 and/or one or more of the steps of method 600. In these or other embodiments, one or more of the steps of method 600 can be implemented as one or more computer instructions configured to run at one or more processing devices 102 and configured to be stored at one or more non-transitory computer storage devices 101. Such non-transitory memory storage devices 101 can be part of a computer system such as system 100, navigation application 130 and/or application platform 150.

In step 610, a navigation application 130 is provided comprising a client interface that facilitates interactions between a language model 140 and a vehicle operator, and a route generation engine 160 that is configured to compute vehicle routes 170. In certain embodiments, the navigation application 130 can be provided via an application platform 150. In some cases, a front-end of the navigation application 130 can be installed on computing devices operated by vehicle operators and back-end of the navigation application 130 can be hosted on the application platform 150. In some instances, the language model 140 can include one or more GPT models 141, or other AI-based chatbot models, that are trained to understand human language inputs received from the vehicle operator relating to scheduling vehicle routes 170.

In step 620, operator interaction data 149 corresponding to interactions between the vehicle operator and the language model 140 is collected. The operator interaction data 149 can include data collected from historical interactions between the vehicle operator and the language model 140 and/or interactions between the vehicle operator and the language model 140 in connection with planning a current vehicle route 170. The operator interaction data 149 may additionally, or alternatively, include data generated based on the vehicular operator's interactions with one or more third-party systems or applications.

In step 630, one or more operator route preferences 180 are determined based, at least in part, on the operator interaction data using the language model 140. As explained above, the language model 140 can be configured to learn various types of operator route preferences 180 including, but not limited to, ride duration preferences 181, distance preferences 182, operating area preferences 183, fuel preferences 184, intermediate stop preferences 185, dining preferences 186, revenue preferences 187, passenger preferences 188, and/or road preferences 189.

In step 640, a personalized vehicle route 170 is generated based, at least in part, on the operator route preferences 180 determined by the language model 140. As described above, a communicate exchange between the language model 140 and the route generation engine 160 can be utilized to identify or generate a personalized vehicle route 170 which is customized according to the operator route preferences 180 learned by the language model 140.

In step 650, the personalized vehicle route 170 for the vehicle operator is output via the navigation application 130. In some cases, this can include generating an interface or display that presents the personalized vehicle route 170 to the vehicle operator. The interface or display can provided on computing devices 110 operated by vehicle operators and/or vehicular navigation devices (e.g., pre-installed or portable vehicular navigation devices). In some cases, a real-time route guidance function 190 can be executed to guide the vehicle operator along the personalized vehicle route 170 in real-time while providing the vehicle operator with turn-by-turn instructions corresponding to the personalized vehicle routes 170.

As evidenced by the disclosure herein, the inventive techniques set forth in this disclosure are rooted in computer technologies that overcome existing problems in known systems, including problems dealing with selecting or personalizing vehicle routes and/or vehicle sessions for vehicle operators. The techniques described in this disclosure provide a technical solution (e.g., one that utilizes pre-trained AI chatbots or machine learning models) for overcoming the limitations associated with known techniques. This technology-based solution marks an improvement over existing capabilities and functionalities related to personalizing or customizing vehicle routes and/or vehicle sessions by improving the manner in which vehicle routes and/or vehicle sessions are identified (e.g., by providing a language model that serves as an intermediary between an vehicle operator and an route generation engine).

In a number of embodiments, the techniques described herein can advantageously provide an improved user experience by enabling an end-user (e.g., vehicle operator) to communicate with an AI-chatbot or language model to identify and select vehicle routes and/or vehicle sessions. These techniques provide a significant improvement over traditional systems that typically generate routes based on shortest distances or travel times.

Furthermore, in a number of embodiments, the techniques described herein can solve a technical problem that arises only within the realm of computer networks, because machine learning does not exist outside the realm of computer networks.

In certain embodiments, a method is implemented via execution of computing instructions by one or more processors and stored on one or more non-transitory computer-readable storage devices. The method comprises: providing a navigation application comprising: a client interface that facilitates interactions between a language model and a vehicle operator; and a route generation engine that is configured to compute vehicle routes; collecting operator interaction data corresponding to interactions between the vehicle operator and the language model; determining, by the language model, one or more operator route preferences based, at least in part, on the operator interaction data; initiating a communication exchange between the language model and the route generation engine to identify a personalized vehicle route based, at least in part, on the operator route preferences determined by the language model; and outputting, via the navigation application, the personalized vehicle route for the vehicle operator.

In certain embodiments, a system comprises one or more processors and one or more non-transitory computer-readable storage devices storing computing instructions configured to run on the one or more processors and cause the one or more processors to execute functions comprising: providing a navigation application comprising: a client interface that facilitates interactions between a language model and a vehicle operator; and a route generation engine that is configured to compute vehicle routes; collecting operator interaction data corresponding to interactions between the vehicle operator and the language model; determining, by the language model, one or more operator route preferences based, at least in part, on the operator interaction data; initiating a communication exchange between the language model and the route generation engine to identify a personalized vehicle route based, at least in part, on the operator route preferences determined by the language model; and outputting, via the navigation application, the personalized vehicle route for the vehicle operator.

In certain embodiments, a method is implemented via execution of computing instructions by one or more processors and stored on one or more non-transitory computer-readable storage devices. The method comprises: providing a navigation application comprising: a client interface that facilitates interactions between a language model and a vehicle operator; and a route generation engine that is configured to compute vehicle routes; collecting operator interaction data corresponding to interactions between the vehicle operator and the language model; determining, by the language model, one or more operator route preferences based, at least in part, on the operator interaction data; initiating a communication exchange between the language model and the route generation engine to personalize an operator session comprising one or more vehicle routes based, at least in part, on the operator route preferences determined by the language model; and outputting, via the navigation application, the one or more vehicle routes for the vehicle operator during the operator session.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A method implemented via execution of computing instructions by one or more processors and stored on one or more non-transitory computer-readable storage devices, the method comprising:
   providing a navigation application comprising:
      a client interface that facilitates interactions between a language model and a vehicle operator; and
      a route generation engine that is configured to compute vehicle routes;
   collecting operator interaction data corresponding to interactions between the vehicle operator and the language model;
   determining, by the language model, one or more operator route preferences based, at least in part, on the operator interaction data;
   initiating a communication exchange between the language model and the route generation engine to identify a personalized vehicle route based, at least in part, on the operator route preferences determined by the language model; and
   outputting, via the navigation application, the personalized vehicle route for the vehicle operator,
   wherein:
      the navigation application is a ride hailing application that enables the vehicle operator to accept requests for transporting passengers;
      the personalized route is utilized in connection with transporting a passenger from an origin location to a destination location;

the one or more operator route preferences include a revenue preference of the vehicle operator;
the route generation engine generates a plurality of candidate vehicle routes based, at least in part, on the origin location and the destination location identified by the language model;
the route generation engine communicates the plurality of candidate vehicle routes to the language model; and
the language model selects the personalized driving route from the plurality of vehicle candidate routes based, at least in part, on the operator route preferences.

2. The method of claim 1, wherein the language model is a generative pre-trained transformer (GPT) model that is trained to understand human language inputs received from the vehicle operator relating to scheduling vehicle routes and to learn the one or more operator route preferences based on the operator interaction data.

3. The method of claim 1, wherein:
the ride hailing application executes a surge pricing function that is configured to dynamically adjust prices for passenger rides in a geographic area based on a current supply of automobile vehicle operators or a current demand for the automobile vehicle operators; and
based on the revenue preference of the vehicle operator, the personalized vehicle route is selected based, at least in part, by identifying the geographic regions where the prices for passenger rides are adjusted by the surge pricing function.

4. The method of claim 1, wherein:
the language model generates scores for the plurality of candidate vehicle routes based, at least in part, on the operator route preferences; and
the personalized vehicle route is generated or selected based, at least in part, on the scores.

5. The method of claim 1, wherein:
the language model is trained to learn a plurality of operator route preferences selected from a group consisting of: a ride duration preference, a distance preference, an operating area preference, a fuel preference, an intermediate stop preference, a dining preference, a revenue preference, a passenger preference, and a road preference; and
the language model determines or selects the personalized vehicle route based, at least in part, on the plurality of operator route preferences learned by the language model.

6. The method of claim 1, wherein the language model is trained, at least, in part, on a domain-specific dataset comprising data related to scheduling vehicle routes and interactions with vehicle operators.

7. The method of claim 1, wherein the language model communicates with the route generation engine to inform the route generation engine of the origin location and the destination location for the personalized vehicle route.

8. The method of claim 1, where the one or more operator route preferences are derived from:
operator interaction data related to interactions between the vehicle operator and the language model in connection with identifying the personalized vehicle route; and
operator interaction data related to historical interactions between the vehicle operator and the language model.

9. The method of claim 8, where the one or more operator route preferences are further derived from operator interaction data related to interactions between the vehicle operator and one or more third-party systems or applications.

10. The method of claim 1, wherein:
the personalized vehicle route is generated in connection with a current operator session for the vehicle operator;
during the current operator session, the language model and the route generation engine communicate to generate a plurality of personalized vehicle routes;
the one or more operator route preferences are utilized to personalize the current operator session; and
the one or more operator route preferences are utilized to identify the plurality of personalized vehicle routes during the current operator session.

11. A system comprising:
one or more processors; and
one or more non-transitory computer-readable storage devices storing computing instructions configured to be executed on the one or more processors and cause the one or more processors to execute functions comprising:
providing a navigation application comprising:
a client interface that facilitates interactions between a language model and a vehicle operator; and
a route generation engine that is configured to compute vehicle routes;
collecting operator interaction data corresponding to interactions between the vehicle operator and the language model;
determining, by the language model, one or more operator route preferences based, at least in part, on the operator interaction data;
initiating a communication exchange between the language model and the route generation engine to identify a personalized vehicle route based, at least in part, on the operator route preferences determined by the language model; and
outputting, via the navigation application, the personalized vehicle route for the vehicle operator,
wherein:
the language model communicates with the route generation engine to inform the route generation engine of an origin location and destination location for the personalized vehicle route;
the route generation engine generates a plurality of candidate vehicle routes based, at least in part, on the origin location and the destination location identified by the language model;
the route generation engine communicates the plurality of candidate vehicle routes to the language model; and
the language model selects the personalized driving route from the plurality of vehicle candidate routes based, at least in part, on the operator route preferences.

12. The system of claim 11, wherein the language model is a generative pre-trained transformer (GPT) model that is trained to understand human language inputs received from the vehicle operator relating to scheduling vehicle routes and to learn the one or more operator route preferences based on the operator interaction data.

13. The system of claim 11, wherein:
the navigation application is a ride hailing application that enables the vehicle operator to accept requests for transporting passengers; and
the personalized route is utilized in connection with transporting a passenger from the origin location to the destination location.

14. The system of claim 13, wherein:
the one or more operator route preferences include a revenue preference of the vehicle operator;

the ride hailing application executes a surge pricing function that is configured to dynamically adjust prices for passenger rides in a geographic area based on a current supply of automobile vehicle operators or a current demand for the automobile vehicle operators; and based on the revenue preference of the vehicle operator, the personalized vehicle route is selected based, at least in part, by identifying the geographic regions where the prices for passenger rides are adjusted by the surge pricing function.

15. A method implemented via execution of computing instructions by one or more processors and stored on one or more non-transitory computer-readable storage devices, the method comprising:

providing a navigation application comprising:
a client interface that facilitates interactions between a language model and a vehicle operator; and
a route generation engine that is configured to compute vehicle routes;

collecting operator interaction data corresponding to interactions between the vehicle operator and the language model;

determining, by the language model, one or more operator route preferences based, at least in part, on the operator interaction data;

initiating a communication exchange between the language model and the route generation engine to identify a personalized vehicle route based, at least in part, on the operator route preferences determined by the language model; and outputting, via the navigation application, the personalized vehicle route for the vehicle operator, wherein:
the route generation engine generates a plurality of candidate vehicle routes based, at least in part, on an origin location and a destination location identified by the language model;
the route generation engine communicates the plurality of candidate vehicle routes to the language model; and
the language model selects the personalized driving route from the plurality of vehicle candidate routes based, at least in part, on the operator route preferences.

16. The method of claim 15, wherein the language model is a generative pre-trained transformer (GPT) model that is trained to understand human language inputs received from the vehicle operator relating to scheduling vehicle routes and to learn the one or more operator route preferences based on the operator interaction data.

17. The method of claim 15, wherein:
the language model is trained to learn a plurality of operator route preferences selected from a group consisting of: a ride duration preference, a distance preference, an operating area preference, a fuel preference, an intermediate stop preference, a dining preference, a revenue preference, a passenger preference, and a road preference; and
the language model determines or selects the personalized vehicle route based, at least in part, on the plurality of operator route preferences learned by the language model.

18. The method of claim 15, wherein the language model is trained, at least, in part, on a domain-specific dataset comprising data related to scheduling vehicle routes and interactions with vehicle operators.

19. The method of claim 15, wherein the language model communicates with the route generation engine to inform the route generation engine of the origin location and the destination location for the personalized vehicle route.

20. The method of claim 15, wherein:
the language model generates scores for the plurality of candidate vehicle routes based, at least in part, on the operator route preferences; and
the personalized vehicle route is generated or selected based, at least in part, on the scores.

21. The method of claim 15, where the one or more operator route preferences are derived from:
operator interaction data related to historical interactions between the vehicle operator and the language model; or
operator interaction data related to interactions between the vehicle operator and one or more third-party systems or applications.

22. The method of claim 15, wherein:
the personalized vehicle route is generated in connection with a current operator session for the vehicle operator;
during the current operator session, the language model and the route generation engine communicate to generate a plurality of personalized vehicle routes;
the one or more operator route preferences are utilized to personalize the current operator session; and
the one or more operator route preferences are utilized to identify the plurality of personalized vehicle routes during the current operator session.

23. A system comprising:
one or more processors; and
one or more non-transitory computer-readable storage devices storing computing instructions configured to be executed on the one or more processors and cause the one or more processors to execute functions comprising:

providing a navigation application comprising:
a client interface that facilitates interactions between a language model and a vehicle operator; and
a route generation engine that is configured to compute vehicle routes;

collecting operator interaction data corresponding to interactions between the vehicle operator and the language model;

determining, by the language model, one or more operator route preferences based, at least in part, on the operator interaction data;

initiating a communication exchange between the language model and the route generation engine to identify a personalized vehicle route based, at least in part, on the operator route preferences determined by the language model; and outputting, via the navigation application, the personalized vehicle route for the vehicle operator, wherein:
the route generation engine generates a plurality of candidate vehicle routes based, at least in part, on an origin location and a destination location identified by the language model;
the route generation engine communicates the plurality of candidate vehicle routes to the language model; and
the language model selects the personalized driving route from the plurality of vehicle candidate routes based, at least in part, on the operator route preferences.

24. The system of claim 23, wherein the language model is a generative pre-trained transformer (GPT) model that is trained to understand human language inputs received from the vehicle operator relating to scheduling vehicle routes and to learn the one or more operator route preferences based on the operator interaction data.

25. The system of claim 23, wherein:

the navigation application is a ride hailing application that enables the vehicle operator to accept requests for transporting passengers; and the personalized route is utilized in connection with transporting a passenger from the origin location to the destination location.

26. The system of claim 25, wherein:

the one or more operator route preferences include a revenue preference of the vehicle operator;

the ride hailing application executes a surge pricing function that is configured to dynamically adjust prices for passenger rides in a geographic area based on a current supply of automobile vehicle operators or a current demand for the automobile vehicle operators; and based on the revenue preference of the vehicle operator, the personalized vehicle route is selected based, at least in part, by identifying the geographic regions where the prices for passenger rides are adjusted by the surge pricing function.

* * * * *